(12) United States Patent
Mikami

(10) Patent No.: US 12,187,932 B2
(45) Date of Patent: Jan. 7, 2025

(54) ADHESIVE FILM HAVING THREE-DIMENSIONAL MOLDED SHAPE

(71) Applicant: 3M INNOVATIVE PROPERTIES COMPANY, St. Paul, MN (US)

(72) Inventor: Haruyuki Mikami, Gotemba (JP)

(73) Assignee: 3M Innovative Properties Company, St. Paul, MN (US)

( * ) Notice: Subject to any disclaimer, the term of this patent is extended or adjusted under 35 U.S.C. 154(b) by 292 days.

(21) Appl. No.: 17/620,200

(22) PCT Filed: Jun. 23, 2020

(86) PCT No.: PCT/IB2020/055929
§ 371 (c)(1),
(2) Date: Dec. 17, 2021

(87) PCT Pub. No.: WO2020/261120
PCT Pub. Date: Dec. 30, 2020

(65) Prior Publication Data
US 2022/0251427 A1 Aug. 11, 2022

(30) Foreign Application Priority Data
Jun. 28, 2019 (JP) ................. 2019-121007

(51) Int. Cl.
*C09J 7/40* (2018.01)
*C09J 7/29* (2018.01)

(52) U.S. Cl.
CPC .............. *C09J 7/403* (2018.01); *C09J 7/29* (2018.01); *C09J 2203/37* (2020.08); *C09J 2301/206* (2020.08); *C09J 2301/208* (2020.08)

(58) Field of Classification Search
CPC . C09J 7/403; C09J 7/29; C09J 2203/37; C09J 2301/206; C09J 2301/208
See application file for complete search history.

(56) References Cited

U.S. PATENT DOCUMENTS 5,141,790 A * 8/1992 Calhoun ................ B05B 12/24
428/354
5,296,277 A * 3/1994 Wilson ....................... C09J 7/38
428/161

(Continued)

FOREIGN PATENT DOCUMENTS

EP 1532220 5/2003
EP 3363872 8/2018

(Continued)

OTHER PUBLICATIONS

International Search Report for PCT International Application No. PCT/IB2020/055929, mailed on Aug. 31, 2020, 3 pages.

*Primary Examiner* — Patricia L. Nordmeyer
(74) *Attorney, Agent, or Firm* — Carlos M. Téllez Rodríguez; 3M Innovative Properties Company

(57) ABSTRACT

An object of the present invention is to provide an adhesive film that can be applied easily to an adherend having a three-dimensional shape. An adhesive film according to the present disclosure is an adhesive film having a three-dimensional molded shape and including: a base layer; an adhesive layer including a fine structure in a surface; and a liner layer covering the adhesive layer. The fine structure of the adhesive layer includes a plurality of convex parts. Each of the plurality of convex parts includes two or more parts joined to each other via an interface. A first part present in a top of the convex part includes a non-adhesive or weak adhesive material, and a second part present below the first part includes a strong adhesive material.

17 Claims, 17 Drawing Sheets

(56) References Cited

U.S. PATENT DOCUMENTS

| | | |
|---|---|---|
| 5,795,636 A | 8/1998 | Keller |
| 10,828,866 B2 | 11/2020 | Nagata |
| 2021/0147722 A1 | 5/2021 | Guyon |

FOREIGN PATENT DOCUMENTS

| | | |
|---|---|---|
| WO | WO 2003-050197 | 6/2003 |
| WO | WO 2018/224788 A | 12/2018 |
| WO | WO 2020-026094 | 2/2020 |

\* cited by examiner

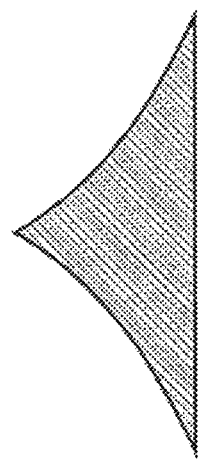
FIG. 1A
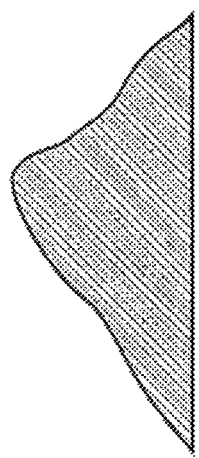
FIG. 1B
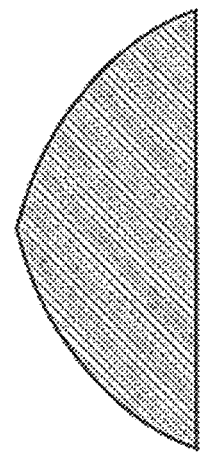
FIG. 1C
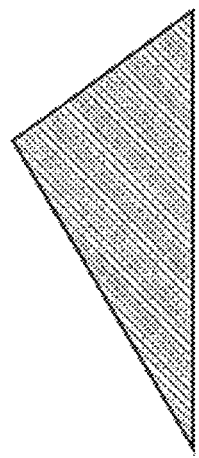
FIG. 1D
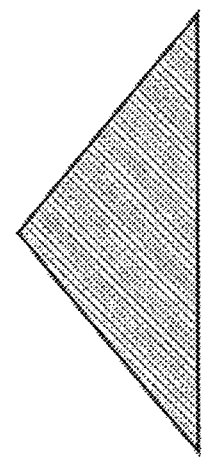
FIG. 1E
FIG. 1F

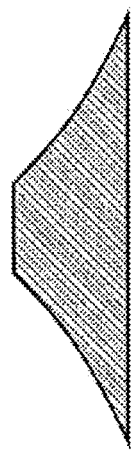
FIG. 2C
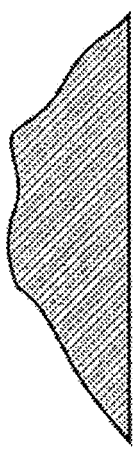
FIG. 2F
FIG. 2B
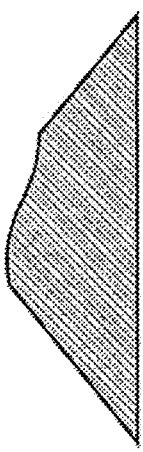
FIG. 2E
FIG. 2A
FIG. 2D

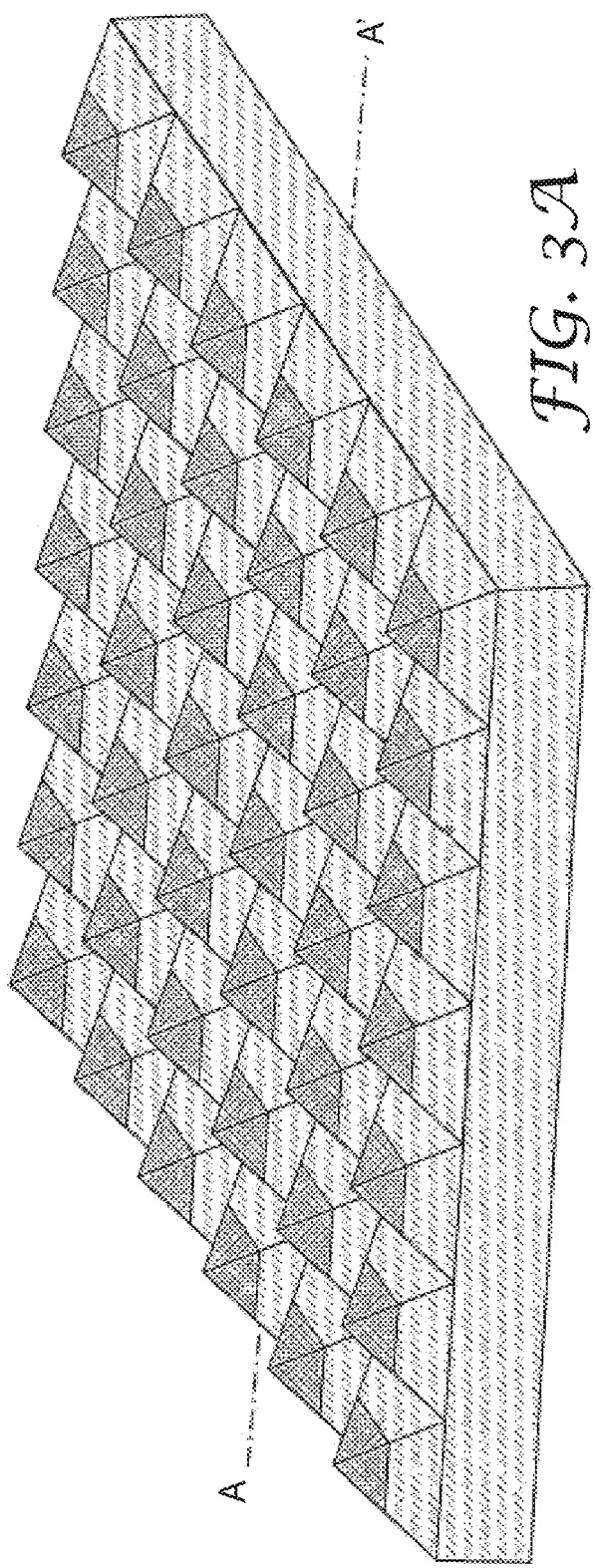
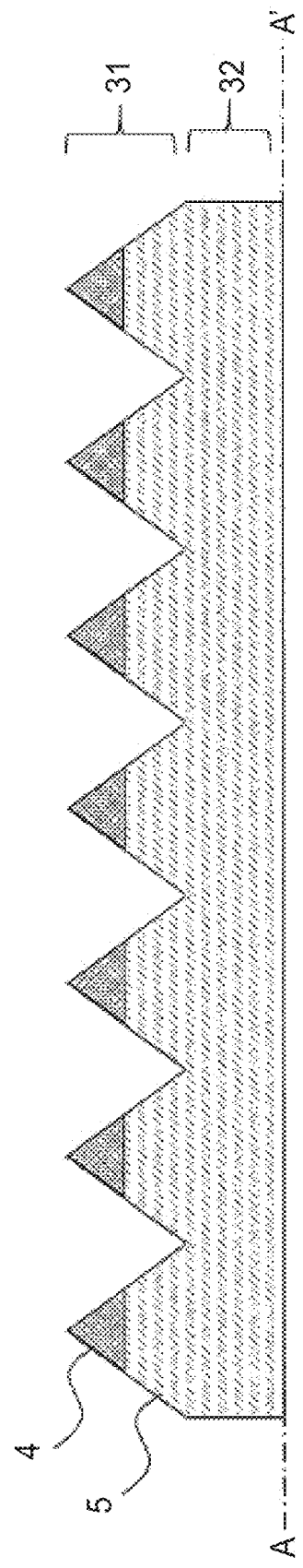
FIG. 3A
FIG. 3B

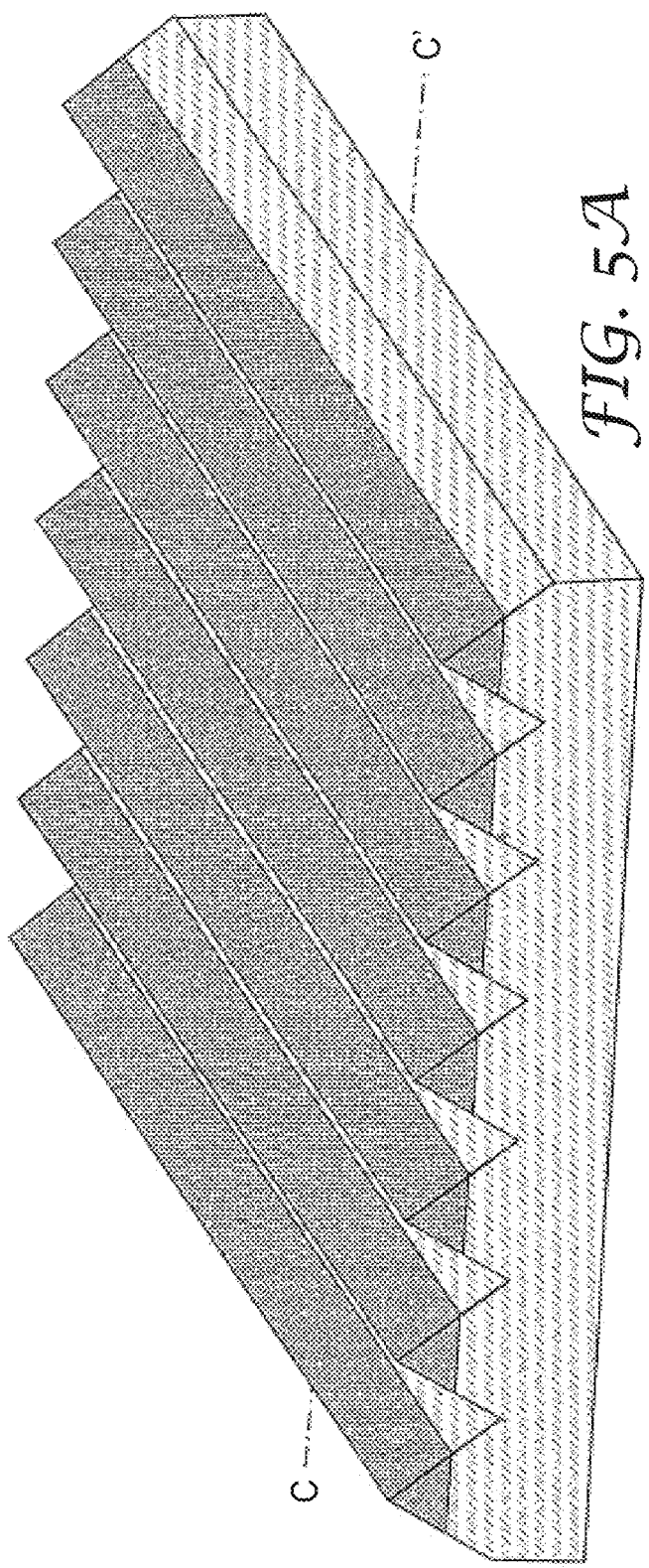
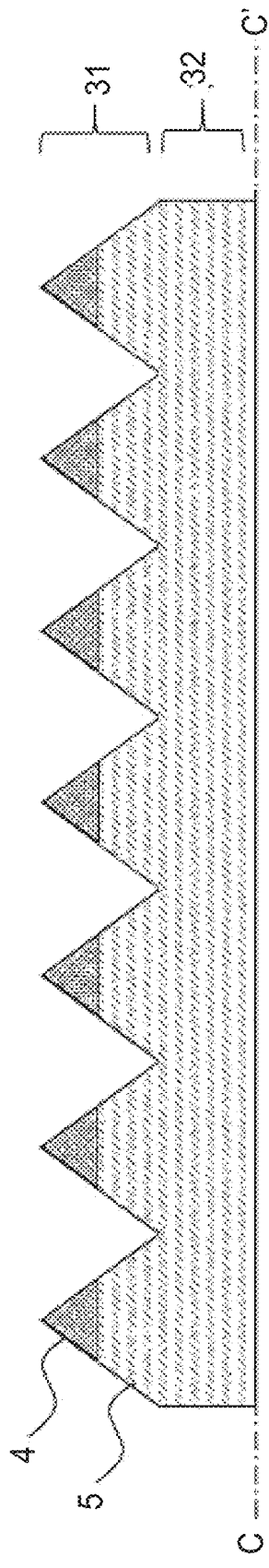
FIG. 5A
FIG. 5B

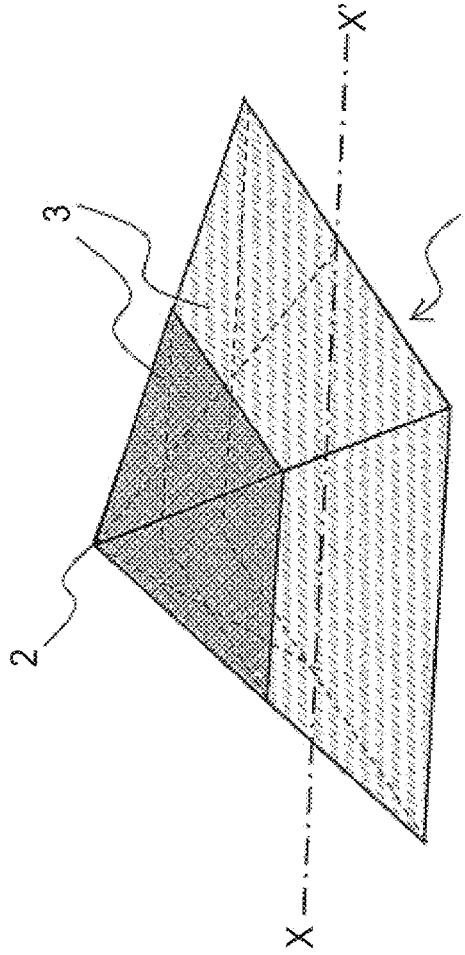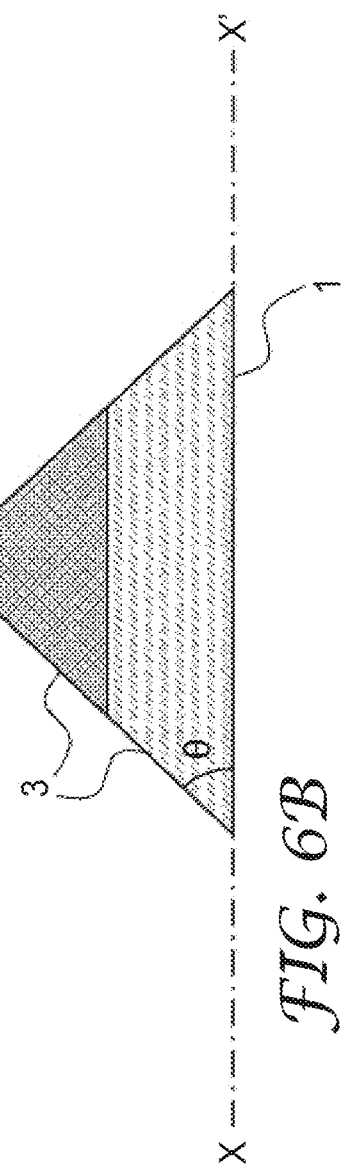
FIG. 6A
FIG. 6B

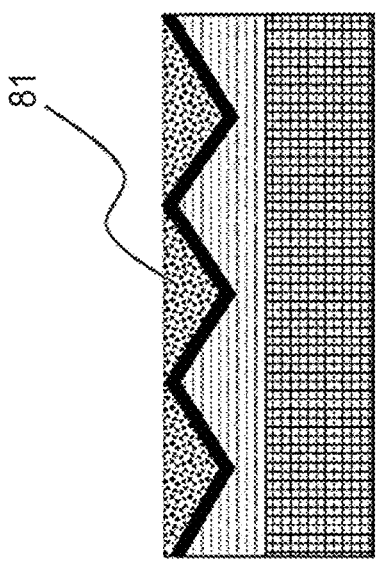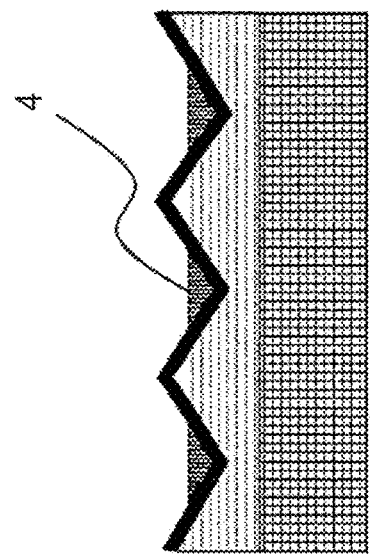
FIG. 10

ADHESIVE FILM HAVING THREE-DIMENSIONAL MOLDED SHAPE

CROSS REFERENCE TO RELATED APPLICATIONS

This application is a national stage filing under 35 U.S.C. 371 of PCT/IB2020/055929, filed 23 Jun. 2020, which claims the benefit of Japanese Application No. 2019-121007, filed 28 Jun. 2019, the disclosures of which are incorporated by reference in their entirety herein.

TECHNICAL FIELD

The present disclosure relates to an adhesive film having a three-dimensional molded shape, and including an adhesive surface that exerts adhesive force under pressure above a certain level while having high slidability under low pressure, and a method of manufacturing the adhesive film.

BACKGROUND

It has been attempted to provide a pressure-sensitive adhesive surface that does not adhere to an adherend under low pressure and that can sufficiently exert adhesive force under pressure above a certain level while being able to be positioned by sliding (that is, having slidability). For example, a technique of dispersing hollow glass microspheres in a surface of an adhesive layer and a technique of providing a non-adhesive projection at a certain interval are known. An adhesive sheet manufactured to include an adhesive layer having at least two adhesive levels is disclosed in Patent No. JP 2000-500514T, and in the adhesive sheet, for example, the adhesive layer includes a plurality of pegs protruding outward from a surface and the pegs are covered with a non-adhesive cap. However, a pressure-sensitive adhesive surface of such an adhesive film of the related art still has insufficient slidability.

Additionally, to apply an adhesive film to an adherend having a three-dimensional shape, in the related art the adhesive film is applied while being stretched, and thus the adhesive film is poor in work efficiency, and in addition, there is also a risk of breakage or the like of the adhesive film. For example, a decorative sheet including a release layer, an adhesive layer disposed in a surface of the release layer, and an outer layer disposed in a surface of the adhesive layer is disclosed, for example, in Patent No. JP 2016-203434 A, and a shape-retaining layer of the release layer can includes a predetermined material, and have a predetermined thickness, and can be heat molded in advance.

SUMMARY

However, even when the sheet as in Patent No. JP 2016-203434 A is molded in advance into a three-dimensional shape corresponding to a shape of an adherend, the adhesive layer cannot slide while being in contact with the adherend, and thus it is difficult to fit the sheet into the adherend. In particular, it is significantly difficult to fit the sheet into an adherend in a case where the adherend has a complex shape or in a case where the adherend has a large size.

In-mold molding, vacuum pressure molding in which an adhesive film is applied with the use of vacuum conditions while being stretched, or the like is also known as a technique for applying an adhesive film to an adherend having a three-dimensional shape. However, a dedicated device is required in a site where the application is performed, and thus a location, a size, or the like of the adherend is restricted. Additionally, a technique enabling slight alignment, air removal, or the like by using a solvent such as water interposed between a pressure-sensitive adhesive surface and an adherend is also known as yet another technique. However, a shape or a location of the adherend is restricted, and such a technique also depends on the skill of an operator. Therefore, the present inventors have considered that, from the perspective of ease, efficiency, convenience, or the like of application, there is a potential need of an adhesive film that is molded in advance into the same three-dimensional shape as a shape of an adherend, and includes a pressure-sensitive adhesive surface sliding on and fitted into the adherend while being in contact with the adherend, and that exerts adhesive force under pressure above a certain level.

The present inventors have found that an adhesive film including: an adhesive layer that can sufficiently exert adhesive force under pressure above a certain level while having very high slidability under low pressure; and a liner layer covering the adhesive layer can be molded in advance into a three-dimensional shape corresponding to a shape of an adherend and that the adhesive film is easily, efficiently and conveniently applied to the adherend. The gist of the present disclosure is as follows.

According to a first aspect, an adhesive film having a three-dimensional molded shape includes:
a base layer;
an adhesive layer including a fine structure in a surface; and
a liner layer
covering the adhesive layer.
The fine structure of the adhesive layer includes a plurality of convex parts.
Each of the plurality of convex parts includes two or more parts joined to each other via an interface. A first part present in a top of the convex part includes a non-adhesive or weak adhesive material, and a second part present below the first part includes a strong adhesive material.

According to a second aspect, in the adhesive film described in the first aspect, an angle θ formed by a side surface and a bottom surface of the convex part is 8° or more.

According to a third aspect, in the adhesive film described in the first or second aspect, when a height of the convex part is set at 100%, a height of the first part is in the range of 10% to 90% of the convex part.

According to a fourth aspect, in the adhesive film described in any one of the first to third aspects, in the fine structure, the longest distance between centers of two convex parts adjacent to each other is 300 µm or less.

According to a fifth aspect, in the adhesive film described in any one of the first to fourth aspects, the convex part is a cone or a frustum, and the number of the cones or the frustums per $mm^2$ of the surface of the adhesive layer is 16 or more.

According to a sixth aspect, in the adhesive film described in any one of the first to fifth aspects, the first part of the convex part includes polyurethane, poly(meth)acrylate, cellulose, silicone, an amine-based resin, a fluorine-based resin, or polyvinyl chloride.

According to a seventh aspect, in the adhesive film described in any one of the first to sixth aspects, the first part of the convex part includes a material having a storage elastic modulus (G') of 3×10$^5$ Pa or more as measured at a frequency of 1 Hz at normal temperature.

According to an eighth aspect, in the adhesive film described in any one of the first to seventh aspects, a dynamic friction coefficient as tested according to JIS K 7125, except that a metal slip piece is used as is, is 1.10 or less.

According to a ninth aspect, in the adhesive film described in any one of the first to eighth aspects, 180° peel adhesion strength as tested under conditions of a temperature of 23° C. and a tensile speed of 200 mm/minute is 1.0 N/10 mm or more in 48 hours after bonding.

According to a tenth aspect, in the adhesive film described in any one of the first to ninth aspects, the three-dimensional molded shape is a shape formed with stretching, and the adhesive film includes portions differing in degree of stretching.

According to an eleventh aspect, in the adhesive film described in any one of the first to tenth aspects, the adhesive film from which the liner layer is removed has a thickness in the range of 0.1 mm to 10.0 mm.

According to a twelfth aspect, in the adhesive film described in any one of the first to eleventh aspects, the adhesive film from which the liner layer is removed has bending rigidity in the range of 200 mgf to 85000 mgf.

According to a thirteenth aspect, an adhesive sheet includes: an adhesive layer including a fine structure in a surface;
a first liner layer covering the adhesive layer; and
a second liner layer
covering the first liner layer.

The fine structure of the adhesive layer includes a plurality of convex parts.

Each of the plurality of convex parts includes two or more parts joined to each other via an interface. A first part present in a top of the convex part includes a non-adhesive or weak adhesive material, and a second part present below the first part includes a strong adhesive material.

According to a fourteenth aspect, in the adhesive sheet described in the thirteenth aspect, peel adhesive force between the first liner layer and the second liner layer is 1 N/25 mm or less at 180° peel adhesion strength as tested under conditions of a temperature of 23° C. and a tensile speed of 200 mm/minute.

According to a fifteenth aspect, in the adhesive sheet described in the thirteenth or fourteenth aspect, the second liner layer has hardness greater than hardness of the first liner layer.

According to a sixteenth aspect, in the adhesive sheet described in any one of the thirteenth to fifteenth aspects, the second liner layer has pencil hardness of 8B or more.

According to a seventeenth aspect, in the adhesive sheet described in any one of the thirteenth to sixteenth aspects, the second liner layer has bending rigidity of 50 mgf or more.

According to an eighteenth aspect, in the adhesive sheet described in any one of the thirteenth to seventeenth aspects, the adhesive sheet from which the second liner layer is removed has a maximum degree of stretching of 190% or more.

According to a nineteenth aspect, a method of manufacturing an adhesive film having a three-dimensional molded shape includes the steps of:
preparing a mold including a fine structure including a plurality of convex parts;
transferring the fine structure of the mold to a first liner layer of a liner including the first liner layer and a second liner layer releasably laminated on one another, to produce a liner including a fine structure;
applying a solution including a non-adhesive or weak adhesive material to a surface including the fine structure of the liner, and then solidifying the solution to form a first part including the non-adhesive or weak adhesive material;
applying a strong adhesive material or a precursor of the strong adhesive material to a surface of the liner in which the first part is formed, to form a second part including the strong adhesive material;
laminating a base layer on the surface including the fine structure of the liner; and
peeling the second liner layer from the first liner layer and then three-dimensionally molding an obtained laminate including the base layer and the first liner layer.

An adhesive film of the present disclosure has a three-dimensional molded shape, and a surface of an adhesive layer has high slidability under low pressure. Thus, the adhesive film can be fitted into an adherend having a three-dimensional shape. Additionally, after the adhesive film is fitted into the adherend, pressure above a certain level is applied to the adhesive film, and thus the adhesive film can be applied to the adherend with sufficient strength. In the related art, an adherend having a three-dimensional shape has been difficult to apply because, for example, the adherend has a complex shape or large adhesive area; however, the adhesive film of the present disclosure can be applied easily to such an adherend.

BRIEF DESCRIPTION OF THE DRAWINGS

FIGS. 1A to 1F each illustrate an example of a cross-sectional view of a solid figure incorporated in a "cone".

FIGS. 2A to 2F each illustrate an example of a cross-sectional view of a solid figure incorporated in a "frustum".

FIGS. 3A and 3B are views illustrating an example of a fine structure in a surface of an adhesive layer; FIG. 3A is a top view; and FIG. 3B is a cross-sectional view of a section indicated by A-A' in FIG. 3A.

FIG. 4A is a top view; and FIG. 4B is a cross-sectional view of a section indicated by B-B' in FIG. 4A.

FIGS. 5A and 5B are views illustrating another example of a fine structure in a surface of an adhesive layer; FIG. 5A is a top view; and FIG. 5B is a cross-sectional view of a section indicated by C-C' in FIG. 5A.

FIGS. 6A and 6B are enlarged views of one of quadrangular pyramids of the fine structure in the surface of the adhesive layer illustrated in FIGS. 3A and 3B; FIG. 6A is a top view; and FIG. 6B is a cross-sectional view of a section indicated by X-X' in FIG. 6A.

FIG. 10 is a view schematically illustrating a state where a solution accumulated in a recess of a fine structure is dried to form a solid, non-adhesive or weak adhesive material serving as a first part.

DETAILED DESCRIPTION

Adhesive Film

An adhesive film of the present disclosure includes a base layer, an adhesive layer including a fine structure in a surface, and a liner layer covering the adhesive layer, and has a three-dimensional molded shape. The fine structure provided in the surface of the adhesive layer provides, as described below, slidability under low pressure, and adhesive force under pressure above a certain level, that is, a controlled adhesive force.

Figure 15:
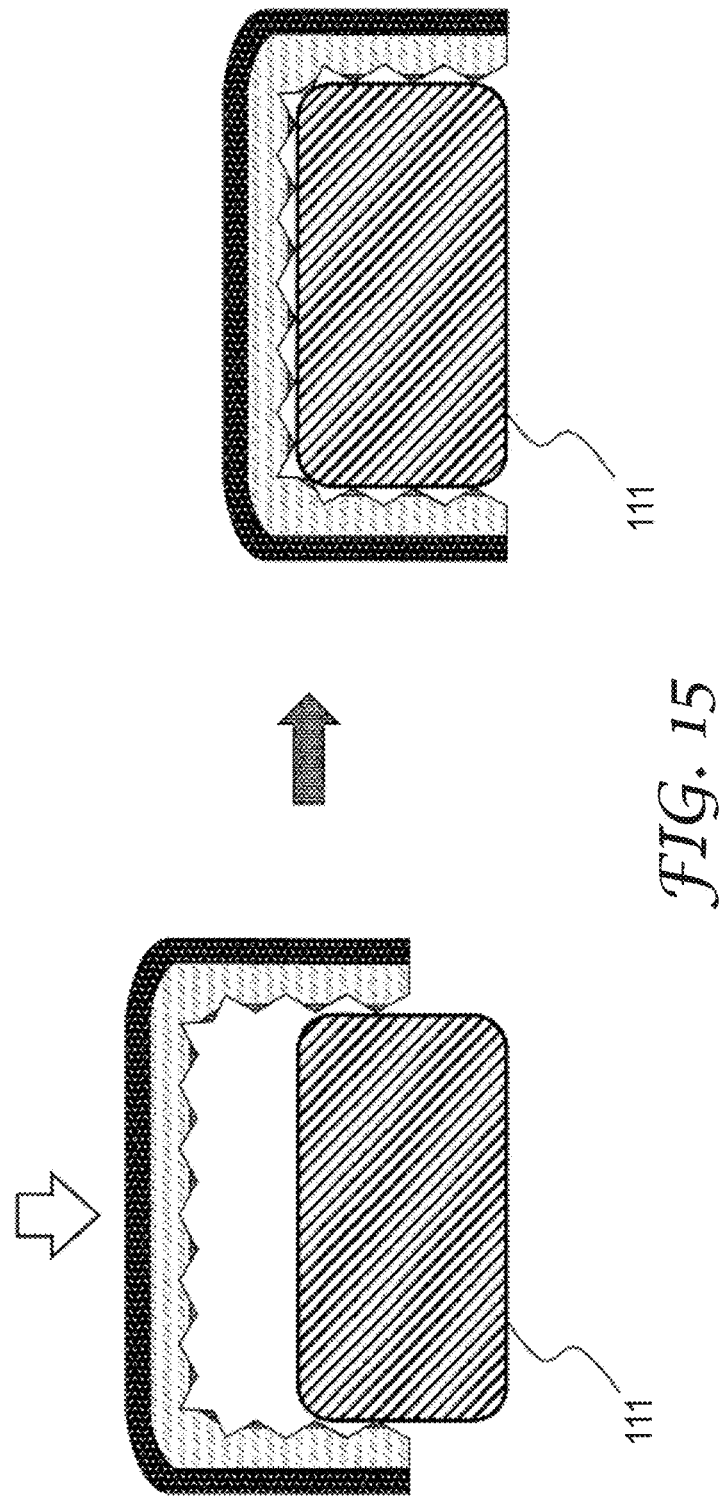
FIG. 15 is a view schematically illustrating a procedure of fitting an adhesive film from which a liner is peeled into an adherend.
Figure 16:
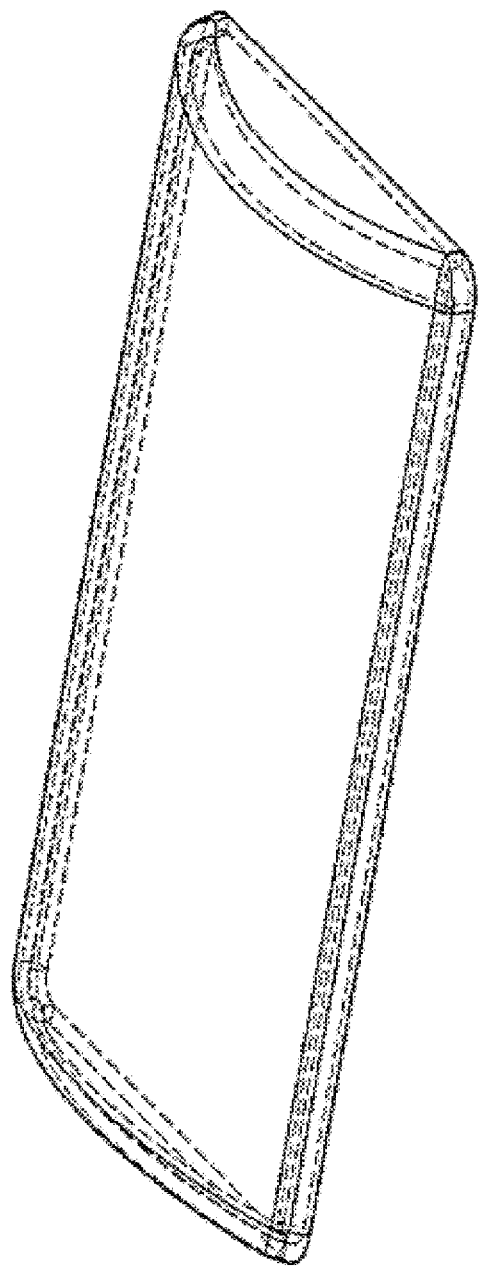
FIG. 16 is an example of a "three-dimensional shape" described herein, and is a view schematically illustrating a mold used in three-dimensional molding in examples.

The "three-dimensional molded shape" or the "three-dimensional shape" herein means a three-dimensional shape having a substantial size (for example, 1 mm or more, or 5 mm or more) in the Z-axis direction as well as in the X-axis direction and the Y-axis direction. Specifically, such a shape is exemplified by a shape of an article including a continuously curved surface and being obtained by bending in the Z-axis direction, a planar article having dimensions in the X-axis direction and the Y-axis direction. An example of the shape is illustrated in FIG. 15.

Three-dimensional molding can be performed, for example, by subjecting a planar adhesive film with the use of a mold having a three-dimensional shape to a known vacuum pressure molding technique. In this case, the three-dimensional shape of the obtained adhesive film is a shape formed with stretching, and degree of stretching at one point on the adhesive film differs from degree of stretching at the other point on the adhesive film, and the thickness and density of the material may differ. In a preferred embodiment, the adhesive film of the present disclosure has such a property that the adhesive film can be molded by a vacuum pressure molding technique. Such a property can be characterized by, for example, heat resistance and stretchability. In an embodiment, the adhesive film of the present disclosure has heat resistance at a temperature of 60° C., 100° C., 140° C., or 160° C., and at that temperature, the base layer, the adhesive layer, and the liner layer do not change in quality. Additionally, in an embodiment, the adhesive film of the present disclosure has stretchability of 190% or more, 200% or more, 250% or more, 300%, or 400% when a pre-stretched state is set at 100%, and breakage or the like of the adhesive film does not occur when the stretchability is within such a range. The adhesive film of the present disclosure is removed from the mold after molding and can substantially retain the three-dimensional shape, for example, in a state where the adhesive film stands on a flat surface.

Adhesive Layer

The adhesive layer of the adhesive film of the present disclosure includes the fine structure in the surface, and the fine structure includes a plurality of convex parts. Herein, a "convex part" is generally a solid figure that includes any plane figure as a bottom surface, and that is constituted by connecting all points in sides of the bottom surface and all points in sides of any other plane figure or any straight line (topmost portion). Preferably, the area of the topmost portion of the convex part is smaller than the area of the bottom surface. More preferably, the convex part has a shape that tapers from the bottom surface to the topmost portion. Examples of the convex part includes a cone, a frustum, and a rib shape.

The "cone" refers to a solid figure that includes any plane figure such as a circle (including an ellipse) or a polygonal shape as a bottom surface, and that is constituted by connecting all points in sides of the bottom surface and a point (vertex) on the other plane. Typical examples of the cone include a circular cone, a triangular pyramid, and a quadrangular pyramid. FIGS. 1A to 1F each illustrate an example of a cross-sectional view of a solid figure incorporated in the "cone" herein. FIG. 1A is a cross-sectional view of a typical cone. However, the "cone" herein includes not only the cone of FIG. 1A, but also those of FIGS. 1B to 1D including skewed side surfaces, and FIG. 1E including a vertex of which a position is deviated from the center of a bottom surface. Accordingly, the "cone" also includes a cone of FIG. 1F including a skewed side surface and a vertex of which a position is deviated from the center of a bottom surface. Note that all the cross sections passing through the vertex of the cone do not necessarily have the same shape, and may have different shapes.

The "frustum" refers to a solid figure obtained by removing, from a cone, a portion of a topmost portion including a vertex. Typical examples of the frustum include a conical frustum, a triangular frustum, and a quadrangular frustum. FIGS. 2A to 2F each illustrate an example of a cross-sectional view of a solid shape incorporated in the "frustum" herein. FIG. 2A is a cross-sectional view of a typical frustum. However, the "frustum" herein includes not only the frustum of FIG. 2A, but also those of FIGS. 2B to 2D having skewed side surfaces. Additionally, a top surface of the frustum may not be parallel to a bottom surface or may not be planar, and accordingly, those of FIGS. 2D to 2F are also incorporated in the "frustum".

The "rib shape" is a solid figure that includes, as a bottom surface, a plane figure structured such that a length in any axial direction (x-axis direction) on a plane is greater than a length in an axial direction (y-axis direction) orthogonal to the x axis, and that is constituted by connecting all points in sides of the bottom surface and all points in lines or sides of a rectangle extending on the other plane in a direction substantially parallel to the x-axis direction. A cross section of the rib shape can have any shape as illustrated in FIGS. 1A to 1F and FIGS. 2A to 2F as with the "cone" and the "frustum". A ratio of the length in the x-axis direction of the bottom surface of the rib shape to the length in the y-axis direction of the rib shape, that is, an aspect ratio is, for example, 2:1 or more, 3:1 or more, 4:1 or more, 5:1 or more, 10:1 or more, 50:1 or more, 100:1 or more, 500:1 or more, 1000:1 or more, or 10000:1 or more. The rib shape may be continuously formed along any axial direction across the entire surface of the adhesive film.

Figure 4A:
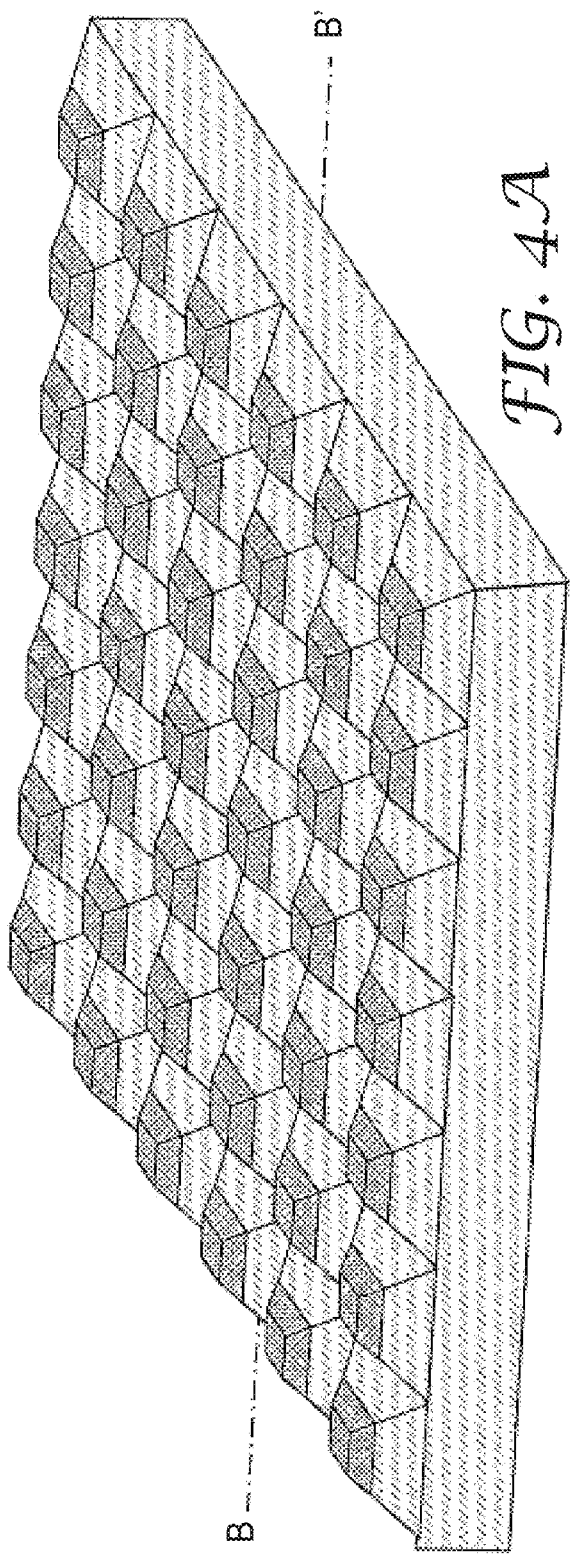
FIGS. 4A and 4B are views illustrating another example of a fine structure in a surface of an adhesive layer.
Figure 4B:
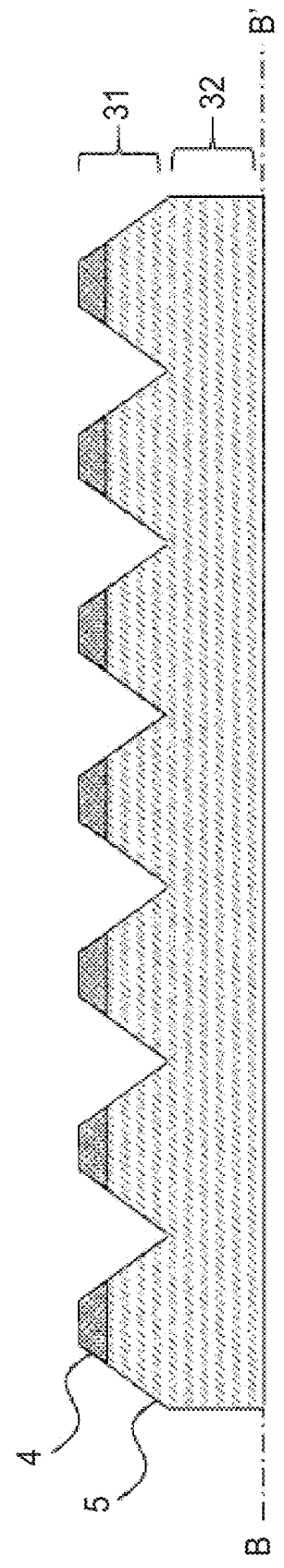

The fine structure includes a structure in which the plurality of convex parts are regularly or randomly aligned preferably on a plane. In an embodiment, the fine structure includes a structure in which the plurality of convex parts are regularly aligned with spacing between the bottom surfaces or without spacing between the bottom surfaces. The shapes of the respective convex parts may be the same or different. The convex parts preferably have substantially the same height (for example, a difference between the heights is within +5%, +3%, or +1%), and more preferably have all substantially the same shape. When the convex parts having different shapes are present, the fine structure preferably includes 10 or less, 9 or less, 8 or less, 7 or less, 6 or less, 5 or less, 4 or less, 3 or less, or 2 or less types of convex parts. Any combination of the cone, the frustum, and the rib shape may also be present. FIGS. 3A and 3B, FIGS. 4A and 4B, and FIGS. 5A and 5B each schematically illustrate an example of a vicinity of the surface of the adhesive layer including the fine structure of the present disclosure. FIGS. 3A and 3B illustrate the surface of the adhesive layer including a structure in which quadrangular pyramids are aligned without spacing, and FIGS. 4A and 4B illustrate the surface of the adhesive layer including a structure in which quadrangular frustums are aligned without spacing. FIGS. 5A and 5B illustrate the surface of the adhesive layer including a structure in which the rib shapes are aligned.

Each of the convex parts includes two or more parts joined to each other via an interface. The being "joined via an interface" means that two matrix phases having different kinds of composition are in contact via a distinct interface. In the present disclosure, a first part (matrix phase) and a second part (matrix phase) are layered and separated as illustrated in FIGS. 3A to 5B and thus are joined via the interface. Note that for example, in the case of a composition in which fine particles are dispersed in a resin, the resin serving as a substrate corresponds to the matrix phase, while the fine particles correspond to a dispersed phase. The joining via an interface does not include joining of two phases including a common matrix phase and different dispersed phases, or a joining manner in which a material varies continuously, for example, in a material in which fine particles are dispersed in a resin, only density of the fine particles continuously varies in a direction. The interface may be a plane parallel or not parallel to the bottom surface of the convex part. The interface may have a surface curved due to, for example, a manufacturing error or surface tension in a manufacturing method described below. The convex part may optionally further include a third part or may have a multilayer structure including three or more parts.

The convex part includes at least the first part present in a top and the second part present below the first part (that is, in the bottom surface). The "top" means a portion that substantially occupies a region located at the highest level of the convex part (a portion of the convex part initially coming into contact with an adherend when the adhesive film of the present disclosure is brought close to the adherend). The top preferably includes a vertex of the cone, a top surface of the frustum, or a line or a rectangle of the topmost portion of the rib shape. The "substantially occupying" means that the case where a different material is attached to or incorporated in only a portion is also included. For example, the first part may occupy a majority (for example, 90% or more, or 95% or more) of a region located at the highest level of the convex part. Even when a small amount of a filler or the like is incorporated in the region, the filler or the like does not correspond to the first part. The first part includes a non-adhesive or weak adhesive material, and the second part includes a strong adhesive material. When the convex part include two parts, the first part including the non-adhesive or weak adhesive material and the second part including the strong adhesive material and being present below the first part are joined to each other via the interface. The first part including the non-adhesive or weak adhesive material supports the adhesive film when pressure applied to the adhesive film is low. Thus, the first part provides slidability to the adhesive film. When pressure applied to the adhesive film becomes above a certain level, the second part including the strong adhesive material comes into contact with the adherend, for example, due to deformation of the second part itself, deformation of the first part, or incorporation of the first part into the second part. Thus, the second part provides adhesiveness. Note that "non-adhesive," "weak adhesive," and "strong adhesive" mean the relative strength of adhesiveness to the same adherend. Adhesiveness can be evaluated by a known technique such as dynamic viscoelasticity measurement or a 180° peeling strength test.

The non-adhesive or weak adhesive material constituting the first part of the convex part preferably has no adhesiveness to an adherend, or has adhesiveness but can be released easily from the adherend. In an embodiment, the non-adhesive or weak adhesive material is a resin having a storage elastic modulus (G') calculated by dynamic viscoelasticity measurement of $3\times10^5$ Pa or more, $4\times10^5$ Pa or more, $5\times10^5$ Pa or more, $6\times10^5$ Pa or more, $7\times10^5$ Pa or more, $8\times10^5$ Pa or more, $9\times10^5$ Pa or more, or $1\times10^6$ or more as measured at a frequency of 1 Hz and at normal temperature. Specific examples include polyurethane, poly (meth) acrylate, cellulose, silicone, an amine-based resin, a fluorine-based resin, and polyvinyl chloride. The non-adhesive or weak adhesive material preferably has a dynamic friction coefficient of 1.10 or less, 1.05 or less, 1.00 or less, 0.95 or less, or 0.90 or less as tested according to JIS K 7125 except that a metal slip piece such . . . as a steel material (for example, an SS400 material, may be plated with chrome or the like) is used as is. The non-adhesive or weak adhesive material preferably has high solubility and/or dispersibility in any general purpose solvent of a water miscible solvent such as water or alcohol, or a water immiscible solvent such as hydrocarbon. Additionally, a solvent in which the non-adhesive or weak adhesive material dissolves and/or disperses preferably has a relatively low vapor pressure and is easy to dry. Further, wettability to a mold is preferably also considered. When the wettability is too low, the solvent may not enter the inside of the fine structure, and when the wettability is too high, the solvent may remain between the fine structures.

A known material used in manufacturing of a pressure sensitive adhesive can be used as the strong adhesive material constituting the second part. Particularly, a material exhibiting relatively strong adhesive force to an adherend, and being not easily peeled again is preferable. In an embodiment, the strong adhesive material can be defined as a material that meets the so-called Dahlquist criterion, specifically a condition where the storage elastic modulus (G') obtained by measuring at normal temperature and a frequency of 1 Hz is less than about $3\times10^5$ Pa. Specific examples include an acrylic adhesive, a rubber-based adhesive, or a silicone-based adhesive. In the strong adhesive material, a tackifier may be blended. The non-adhesive or weak adhesive material, and the strong adhesive material preferably have hardness above a certain level to maintain the fine structure. For example, a material having a tan δ of 0.8 or less, 0.7 or less, 0.6 or less, 0.5 or less, 0.4 or less, or 0.3 or less as measured at normal temperature and a frequency of 1 Hz is preferable.

A combination of the first part and the second part is not limited, but materials are more preferably selected in consideration of adhesive force between the first part and the second part. For example, from the perspective of affinity of a polymer structure and the like, when the first part is silicone, the second part is also preferably a silicone-based adhesive. However, the first part and the second part are not necessarily polymers having the same structure.

The adhesive layer of the adhesive film of the present disclosure may include a base located below the fine structure in the surface. The base is joined or continuously formed with the bottom surface of the convex part of the fine structure. A material of the base may be the same as or different from the material of the second part. In an embodiment, the convex part includes two parts of the first part and the second part, and the base includes the same material as the material of the second part and is continuously formed with the second part. For example, in the embodiments illustrated in FIGS. 3A and 5B, a base (32) is provided under a surface (31) of the adhesive layer, and the base includes the same material as a material of a second part (5) located below a first part (4) and is continuously formed with the second part. The thickness of the base may be arbitrarily set depending on the desired thickness of the adhesive layer. In a case where the material of the base has elasticity, the convex part in the fine structure can sink into the base, and thus the second part of the convex part easily comes into contact with an adherend, and the adhesiveness of the adhesive film may be improved.

The adhesive layer can entirely be made transparent when any of the non-adhesive or weak adhesive material constituting the first part, the strong adhesive material constituting the second part, and, when present, the materials constituting the other parts is transparent. At that time, to make the interface via which the parts are joined invisible, a difference in a refractive index among the materials constituting these parts is preferably within 1%. Specifically, in a case where the first part and the second part of the convex part are adjacent to each other and a difference between a refractive index of the material constituting the first part and a refractive index of the material constituting the second part is within 1%, 0.9%, 0.8%, 0.7%, or 0.6%, the interface between the first part and the second part is generally invisible. For example, when the first part includes a transparent acrylic resin and the second part includes a transparent acrylic adhesive, the above-described requirement is satisfied, and the adhesive layer completely transparent can be provided. Note that transparent can be defined by, for example, haze of 40% or less as measured in accordance with JIS K 7136.

FIGS. 6A and 6B are enlarged views of one of the quadrangular pyramids of the fine structure in the surface of the adhesive layer illustrated in FIGS. 3A and 3B. FIG. 6A is a top view, and FIG. 6B is a cross-sectional view including a vertex of a cone at a section indicated by X-X' in FIG. 6A. As illustrated in FIGS. 6A and 6B, the cone includes a bottom surface (1) and a side surface (3) obtained by connecting a side of the bottom surface and a vertex (2), and the bottom surface (1) and the side surface (3) form an angle θ. Similarly, in a frustum that is a figure made by partially removing a topmost portion of a cone, the angle θ formed by a bottom surface and a side surface can be defined. Similarly, in the rib shape as illustrated in FIGS. 5A and 5B, as for the cross-section of the rib shape, the angle θ formed by a bottom surface and a side surface can be defined. In an embodiment, the angle θ formed by the side surface and the bottom surface of the convex part may be 8° or more, 10° or more, 15° or more, 20° or more, or 25° or more in any cross-section including the vertex or the topmost portion, from the perspective of, for example, ease of formation of the first part or slidability of the adhesive film. Additionally, from the perspective of, for example, smoothly peeling the adhesive film from the liner, the angle θ may be less than 90°, 85° or less, 80° or less, or 70° or less in any cross-section including the vertex or the topmost portion.

In an embodiment, the first part present in the top of the convex part has a height of 10% or more, 15% or more, 20% or more, 25% or more, or 30% or more, and 90% or less, 85% or less, 80% or less, 75% or less, or 70% or less when the overall height of the convex part is set at 100%. Note that the height is based on the normal direction of the bottom surface of the convex part. When the interface between the first part and the part located below the first part is a plane or a curved surface that is not parallel to the bottom surface, the height is calculated from the average value of the heights of the interface as determined based on the normal direction of the bottom surface. When the first part is relatively small, the slidability of the adhesive film decreases and frictional force increases. However, adhesive force exerted under pressure above a certain level tends to increase. On the other hand, when the first part is relatively large, the opposite is true.

In an embodiment, in the method of manufacturing an adhesive film as described below, from the perspective of, for example, ease of the formation of the first part, the longest distance between centers of two convex parts adjacent to each other of the fine structure may be 300 μm or less, 260 μm or less, 220 μm or less, 180 μm or less, 140 μm or less, or 100 μm or less. Note that the center of the convex part means a vertex of a cone, a vertex of a corresponding cone of a frustum, or a topmost portion of a rib shape.

In an embodiment, in the method of manufacturing an adhesive film as described below, from the perspective of, for example, case of the formation of the first part, when the convex part is a cone or a frustum, the size of a bottom surface may be 500 μm or less, 450 μm or less, 400 μm or less, 350 μm or less, 300 μm or less, 250 μm or less, 200 μm or less, 150 μm or less, 100 μm or less, 95 μm or less, 90 μm or less, 85 μm or less, 80 μm or less, 75 μm or less, 70 μm or less, 65 μm or less, 60 μm or less, 55 μm or less, or 50 μm or less. Here, the size of the bottom surface means the length of the longest straight line of straight lines obtained by connecting any two points on the sides of the bottom surface. When the convex part has a rib shape, the size in the y-axis direction of a bottom surface of the rib shape may be 500 μm or less, 450 μm or less, 400 μm or less, 350 μm or less, 300 μm or less, 250 μm or less, 200 μm or less, 150 μm or less, 100 μm or less, 95 μm or less, 90 μm or less, 85 μm or less, 80 μm or less, 75 μm or less, 70 μm or less, 65 μm or less, 60 μm or less, 55 μm or less, or 50 μm or less.

In an embodiment, the height of the convex part may be 5 μm or more and 100 μm or less, 95 μm or less, 90 μm or less, 85 μm or less, 80 μm or less, 75 μm or less, 70 μm or less, 65 μm or less, 60 μm or less, 55 μm or less, or 50 μm or less, from the perspective of, for example, preventing the occurrence of inconvenience in a manufacturing process of an adhesive film as described below or avoiding difficulty in peeling the liner from the finished adhesive film.

In an embodiment, when the convex part is a cone or a frustum, the number of the cones or the frustums is preferably 16 or more, 25 or more, 36 or more, 49 or more, 64 or more, 81 or more, or 100 or more per mm² of the surface of the adhesive layer, from the perspective of providing sufficient slidability. The number of the cones or the frustums corresponds to the number of the centers of the cones or the frustums present in the unit area. The high density of the cones or the frustums also contributes to improvement of slidability. Note that the achievement of such density is difficult in the related art such as the formation of a mold by etching, or dropping or disposition of a foreign substance (non-adhesive beads, resin, or the like) on an adhesive.

Bottom surfaces of the two convex parts adjacent to each other may be located close to each other. For example, in a case where the convex part is a quadrangular pyramid or a quadrangular frustum, or a hexagonal pyramid or a hexagonal frustum, bottom surfaces of two quadrangular pyramids adjacent to each other or two quadrangular frustums adjacent to each other may share one side. Alternatively, sides adjacent to each other may be separated by a distance of, for example, 250 µm or less, 200 µm or less, 150 µm or less, 100 µm or less, 50 µm or less, or 10 µm or less. For example, when the convex part has a rib shape, bottom surfaces adjacent to each other may share one side. Alternatively, sides adjacent to each other may be separated by a distance of, for example, 250 µm or less, 200 µm or less, 150 µm or less, 100 µm or less, 50 µm or less, or 10 µm or less. Note that the achievement of such proximity disposition is difficult in the related art such as the formation of a mold by etching, or dropping or disposition of a foreign substance (non-adhesive beads, resin, or the like) on an adhesive.

When the convex part includes a frustum, the size of a top surface of the frustum is, for example, 50 µm or less, 40 µm or less, 30 µm or less, 20 µm or less, or 10 µm or less, from the perspective of, for example, ease of the formation of the first part in the method of manufacturing an adhesive film as described below. Here, the size of the top surface refers to the diameter of the top surface in the case of a conical frustum, and refers to the longest straight line of straight lines joining any two points on the sides of the top surface in the case of a truncated pyramid or other shape of a frustum. Additionally, the reduction of adhesive force exerted under pressure above a certain level can be prevented by making the size of the top surface not too large with respect to the bottom surface.

The thickness of the adhesive layer can arbitrarily be set depending on an adhesive material to be used, the intended use of the adhesive film, or the like, and can be, for example, in the range of 15 µm to 10 mm. The thickness of the adhesive layer is based on the normal direction of the bottom surface of the convex part, and means a distance between a portion located at the highest level of the convex part, and an end of the base located in the opposite side to the surface including the fine structure.

The adhesive layer may include an additional material other than an adhesive, for example, fine particles such as hollow or solid glass spheres for the purpose of adjusting adhesiveness. However, the adhesive film of the present disclosure can achieve a desired property without including such an additional material. In an embodiment, the adhesive layer includes no fine particle.

Base Layer

A material of the base layer of the adhesive film of the present disclosure is not particularly limited as long as the base layer can be molded by a three-dimensional molding technique such as vacuum pressure molding. For example, a resin film including ABS, ASA, poly(meth)acrylate, polycarbonate, polyurethane, a fluorine-based resin, polypropylene, polyethylene terephthalate (PET), polybutylene terephthalate (PBT), polyethylene naphthalate (PEN), polypropylene (PP), polyvinyl chloride (PVC), or a vinyl chloride-vinyl acetate copolymer, or a combination thereof can be used suitably. Note that in a case where an elastic material such as acrylic foam is used for the base layer, the convex part in the fine structure can sink into the base layer, and thus the second part of the convex part more easily comes into contact with an adherend, and the adhesiveness of the adhesive film may be improved. The characteristics of the base layer can be adjusted appropriately by using, for example, a plasticizer or the like. Any layer including a primer or the like may be present between the base layer and the adhesive layer. Additionally, any layer such as a design layer formed of a colored resin and formed by metal deposition or the like, or a cover layer that protects the design layer may be provided in a surface located in the opposite side to the adhesive layer of the base layer. The thickness of the base layer is not particularly limited as long as the base layer can be molded by a three-dimensional molding technique such as vacuum pressure molding, but is typically 10 µm or more, 25 µm or more, 50 µm or more, or 100 µm or more and 300 µm or less, 600 µm or less, 900 µm or less, or 1200 µm or less.

Liner Layer

A material of the liner layer of the adhesive film of the present disclosure is not particularly limited as long as the liner layer can be molded by a three-dimensional molding technique such as vacuum pressure molding. For example, a film including polyethylene, polypropylene, polyurethane, polycarbonate, an ABS resin, an ASA resin, polyvinyl chloride (PVC), a vinyl chloride-vinyl acetate copolymer, or the like can be used suitably. A surface of the liner layer may be coated with a release coating for ease of peeling from the adhesive layer, for example, by applying a silicone solution as necessary. Note that the "liner layer" here corresponds to the first liner layer of the first liner layer and the second liner layer of the liner described in the method of manufacturing an adhesive film as described below.

Method of Manufacturing Adhesive Film

In an embodiment, the adhesive layer including the fine structure in the surface of the adhesive film of the present disclosure can be produced through the steps of: preparing a mold including a fine structure including a plurality of convex parts; transferring the fine structure of the mold to produce a liner including a fine structure; applying a solution including a non-adhesive or weak adhesive material to the liner including the fine structure, and then solidifying the solution to form a first part including the non-adhesive or weak adhesive material; and applying a strong adhesive material or a precursor of the strong adhesive material to the liner in which the first part is formed, to form a second part including the strong adhesive material. The liner includes the first liner layer and the second liner layer that are releasably laminated on one another, and the fine structure is transferred to the first liner layer. Accordingly, at this stage, the second liner layer, the first liner layer, the first part including the non-adhesive or weak adhesive material, and the second part including the strong adhesive material are laminated on one another in order from below. The adhesive film having the three-dimensional molded shape of the present disclosure can be produced subsequently further through the steps of: laminating a base layer on the surface including the fine structure of the liner; and peeling the second liner layer from the first liner layer and then three-dimensionally molding an obtained laminate including the base layer and the first liner layer.

Preparation of Mold

Figure 7:
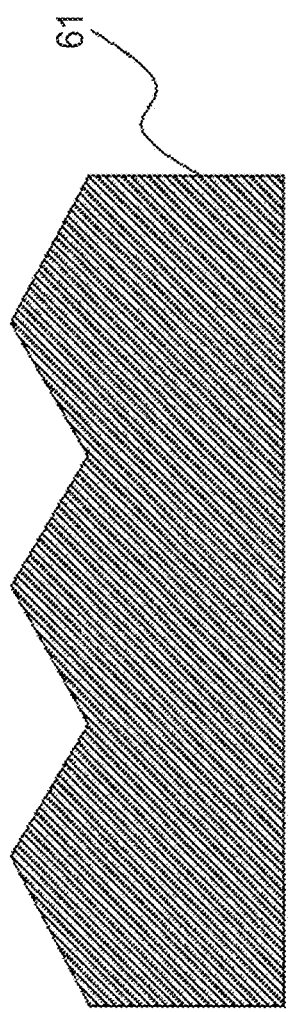
FIG. 7 is a view schematically illustrating a cross-sectional shape of a portion of a mold.

Firstly, a mold including a fine structure including a plurality of convex parts in a surface is prepared. FIG. 7 schematically illustrates a cross-sectional shape of a portion of the mold. A mold (61) can be produced by machining a flat plate including a material such as a metal or a resin by a method using a diamond cutter or a laser. The fine structure formed in the surface of the mold is substantially the same as the fine structure formed in the surface of the adhesive layer. A difference in the size between the fine structure in the surface of the mold and the fine structure in the surface of the adhesive layer is preferably within +5%, within +3%, or within +1%. However, with respect to the height of the convex part, a difference greater than the difference described above may be caused by the effect of shrinkage of the second part or gravity. Note that the size of the fine structure in the surface of the adhesive layer means the size obtained immediately after peeling the liner (the first liner layer), for example, within 5 minutes or within 3 minutes after peeling the liner.

Production of Liner

Figure 8:
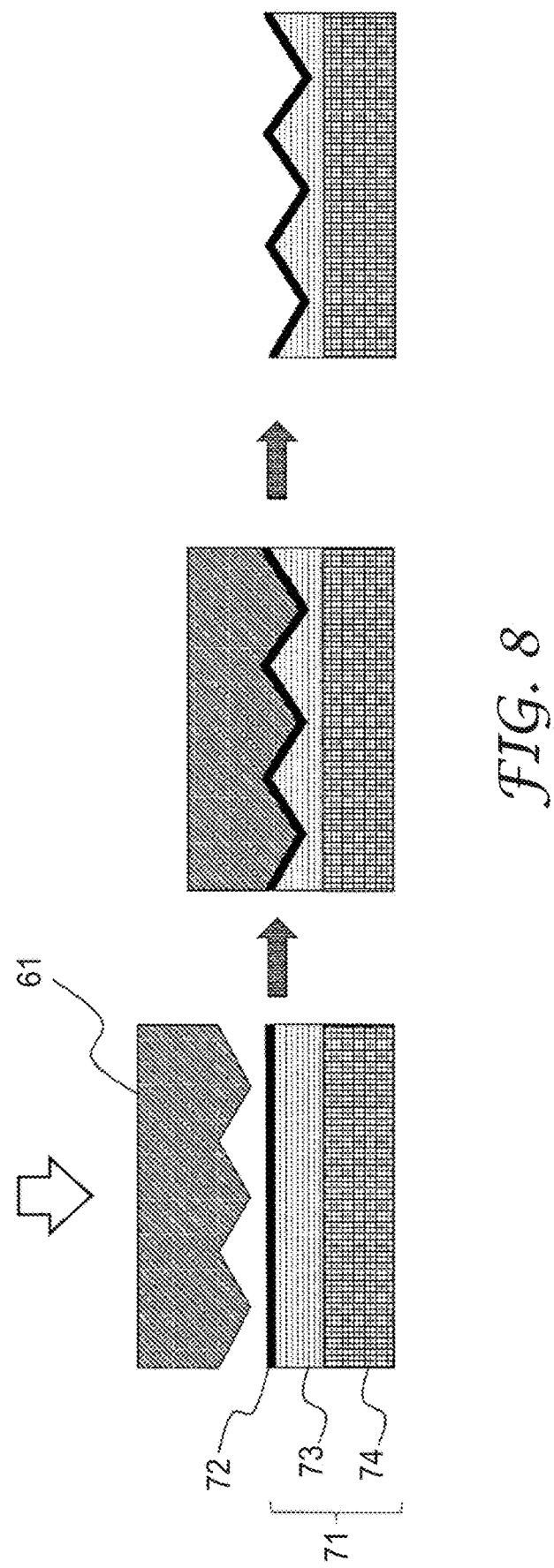
FIG. 8 is a view schematically illustrating a procedure of pressing a mold against a liner to transfer a fine structure in a surface of the mold to the liner.

Next, the mold is pressed against the liner to transfer the fine structure in the surface of the mold to the liner. FIG. 8 schematically illustrates a procedure of the transferring. A liner (71) includes at least a first liner layer (73) and a second liner layer (74) that are releasably laminated on one another. The first liner layer (73) is a liner that covers the surface of the adhesive layer just before the three-dimensional molded adhesive film of the present disclosure is applied to an adherend. On the other hand, as described below, the second liner layer (74) is peeled from the first liner layer and removed prior to three-dimensional molding of the adhesive film. Any additional layer such as a primer layer may be provided between the first liner layer and the second liner layer. Of the first liner layer and the second liner layer constituting the liner, the fine structure is mainly transferred to the first liner layer. However, in a case where the first liner layer is very thin as compared to the fine structure in the surface of the mold, the fine structure may also be transferred to the second liner layer.

To peel the second liner layer while leaving the first liner layer in the adhesive layer surface, peel adhesive force between the first liner layer and the second liner layer is preferably 1 N/25 mm or less, 0.5 N/25 mm or less, or 0.2 N/25 mm or less, at 180° peel adhesion strength as tested under conditions of a temperature of 23° C. and a tensile speed of 200 mm/minute. Note that the "peel adhesive force between the first liner layer and the second liner layer" means a value obtained by measuring 180° peel adhesion strength when the first liner layer is gripped and peeled from the second liner layer. The peel adhesive force between the first liner layer and the second liner layer does not substantially change before and after the step of transferring the fine structure of the mold.

The liner as a whole needs to be a liner that the fine structure can be transferred to and that can retain the fine structure. The second liner layer is removed before three-dimensional molding as described below is performed. Thus, it is sufficient that the second liner layer can satisfy the above-described requirements, and a material of the second liner can be relatively freely selected. Preferably, when the second liner layer has, for example, pencil hardness of 8B or more, 7B or more, or 6B or more, or bending rigidity of 50 mgf or more, 100 mgf or more, or 150 mgf or more, the fine structure can be transferred efficiently to the first liner layer. Examples of the material of the second liner layer include a resin material such as a polyester resin such as polyethylene terephthalate (PET) or polybutylene terephthalate (PBT), a cellulose material such as paper, or a combination thereof. On the other hand, the first liner layer is not particularly limited as long as the first liner layer can be molded by a three-dimensional molding technique such as vacuum pressure molding, as described above for the liner of the adhesive film. For example, a film including polyethylene, polypropylene, polyurethane, polycarbonate, an ABS resin, an ASA resin, polyvinyl chloride (PVC), a vinyl chloride-vinyl acetate copolymer, or the like can be used suitably. A release coating (72) may be applied by using silicone or the like to a surface located in the opposite side to the second liner layer (74) of the first liner layer (73), to provide a release surface. The first liner layer needs to have a property enabling three-dimensional molding, and thus needs to include a relatively soft material. With use of the first liner layer alone, it may be difficult to apply the fine structure or deformation may occur after application and drying of the solution during the formation of the adhesive layer. However, such a first liner layer is laminated on the second liner layer including a relatively hard material, and thus the transferring of the fine structure to the liner and application and drying of various solutions can be performed.

The fine structure can be transferred to the liner (71) for example, by bringing a mold into contact with a surface of the liner and performing heat pressing. Due to the transferring, a structure complementary to the fine structure of the mold, that is, a structure including a plurality of recesses corresponding to the plurality of convex parts is formed in the surface of the liner. The fine structure is transferred to at least the surface of the first liner layer (73) and may optionally be transferred to the interface between the second liner layer (74) and the first liner layer (73).

Adhesive Layer: Formation of First Part

Figure 9:
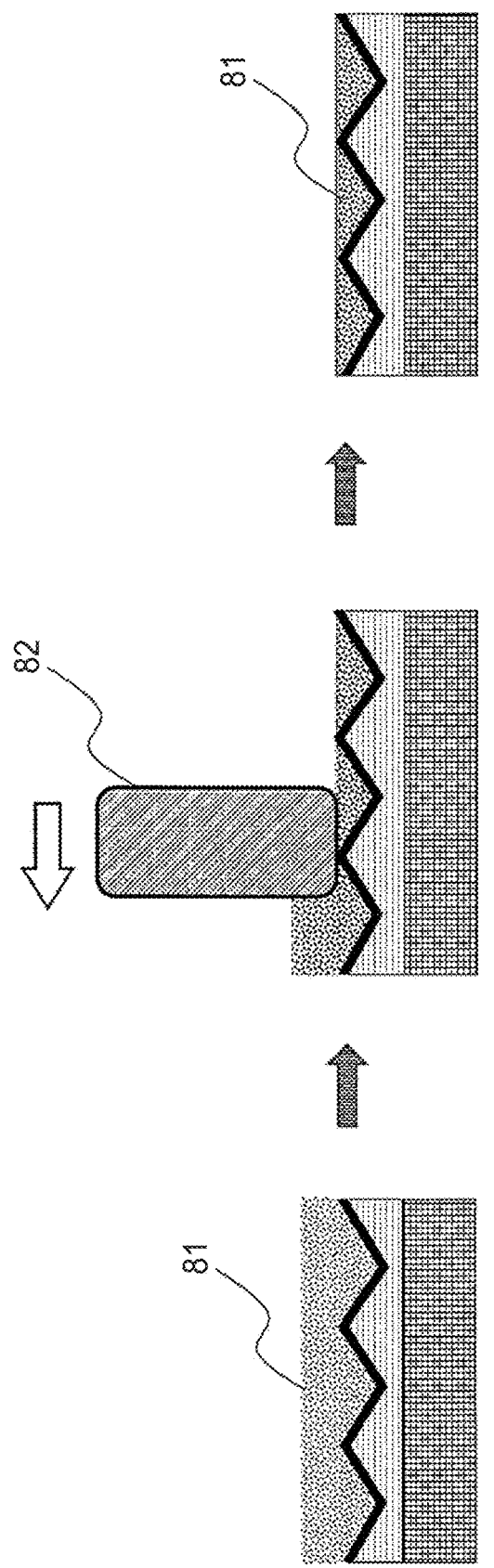
FIG. 9 is a view schematically illustrating a procedure of applying a solution including a non-adhesive or weak adhesive material to a fine structure formed in a surface of a liner and scraping off excess of the solution.

Next, a solution including a non-adhesive or weak adhesive material is applied by, for example, coating or spraying to the fine structure formed in the surface of the liner, and excess of the solution is scraped off by a doctor blade or a squeegee. FIG. 9 schematically illustrates a procedure of applying the solution including the non-adhesive or weak adhesive material to the fine structure formed in the surface of the liner and scraping off the excess of the solution. In the fine structure formed in the surface of the liner, the recesses are preferably located close to each other with spacing, and thus the solution is easily scraped off and easily accumulates in the respective recesses formed in the surface of the liner. Then, the solution is dried to remove the solvent, and thus the liner that includes the solid, non-adhesive or weak adhesive material serving as the first part and being disposed at a lowermost portion of each recess is obtained.

FIG. 10 is a view schematically illustrating a state where a solution (81) accumulated in the recesses is dried to form a solid, non-adhesive or weak adhesive material constituting the first part (4). After drying, the non-adhesive or weak adhesive material may be cured as necessary by irradiation with an ultraviolet ray, an electron beam, or the like. In an embodiment, as illustrated in FIG. 10, the solid, non-adhesive or weak adhesive material serving as the first part occupies a space from a lowermost portion to a middle of the mold, and includes, in an upper portion, a surface substantially parallel to the horizontal plane determined by the placement of the mold during drying. Note that, depending on the non-adhesive or weak adhesive material, the solvent, or the like used, the solid, non-adhesive or weak adhesive material serving as the first part may have a spherical shape. In the mold used in producing the liner, when the angle θ formed by the side surface and the bottom surface of the convex part is too small, or when the distance between the bottom surfaces of the convex parts is too large, it is difficult to drop the solution including the non-adhesive or weak adhesive material to the lowermost portions of the recesses, and thus it may be difficult to form the first part. The solution is made by dissolving and/or dispersing a resin such as polyurethane, poly (meth)acrylate, cellulose, silicone, an amine-based resin, a fluorine-based resin, or polyvinyl chloride in an appropriate solvent. The solvent used in the solution may also affect the above-described scraping off of the solution. For example, when a solvent such as ethyl acetate, methyl ethyl ketone, methyl isobutyl ketone, or the like is used, the distance between the bottom surfaces of the convex parts in the mold is preferably smaller (for example, 50 µm or less).

Adhesive Layer: Formation of Second Part

A strong adhesive material or a precursor of the strong adhesive material is applied to the liner in which the first part is formed, to form a second part, and thus an adhesive layer is formed. When any other part is present between the first part and the second part, the second part is formed after the formation of the first part and then the formation of the any other part. The application of the strong adhesive material can be performed by a variety of methods. For example, a strong adhesive material molded in advance into a sheet shape or the like is applied to a fine structure surface of the liner, and stands under heat and/or pressure, or at normal temperature and normal pressure for a certain period of time or more. Thus, the strong adhesive material flows and enters the recess in the surface of the liner, and is joined to the first part located at the lowermost portion of the recess. Additionally, in another example, a precursor that cures by irradiation with an energy ray such as an ultraviolet ray or an electron beam to be a strong adhesive material is applied to the fine structure surface of the liner to enter the recess, and then is irradiated with an energy ray. Additionally, In another example, a solution of a strong adhesive material is applied to the fine structure surface of the liner to enter the recess, then heated as necessary, and dried to remove the solvent.

Lamination of Base Layer

Figure 11:
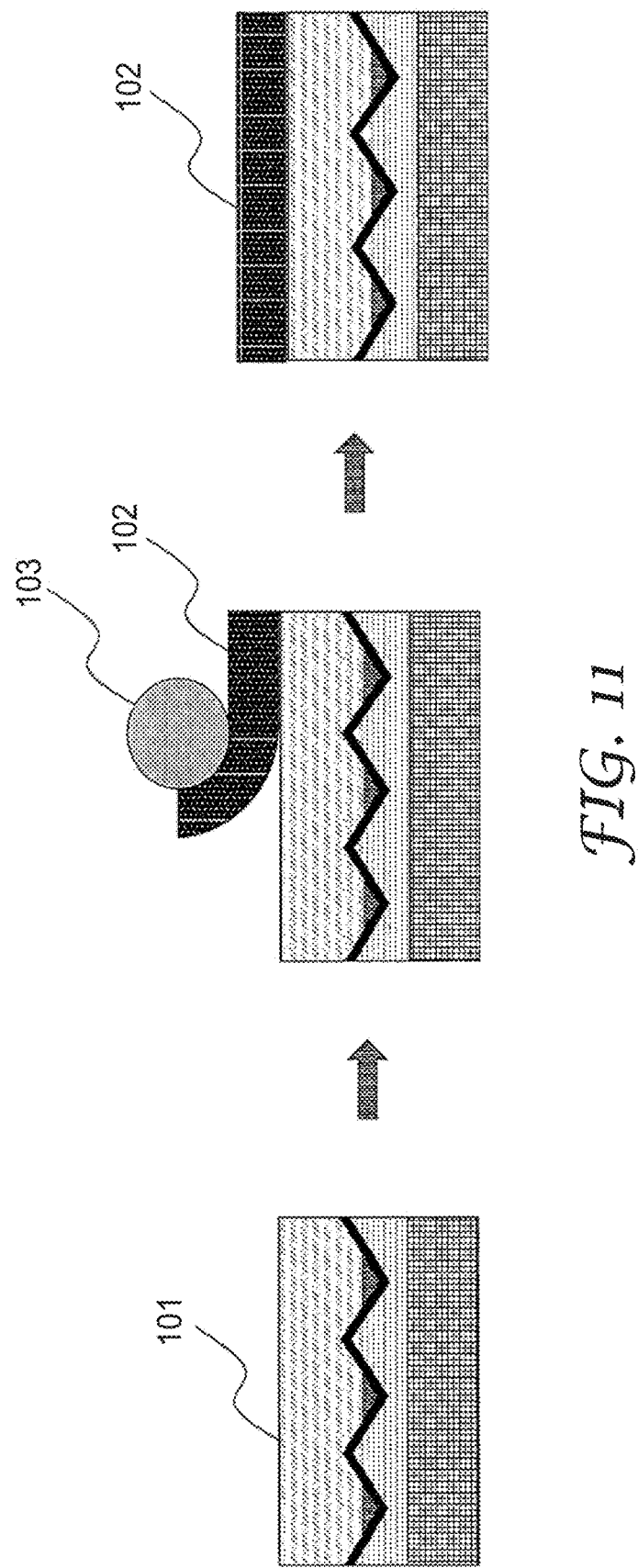
FIG. 11 is a view schematically illustrating a procedure of applying a strong adhesive material or a precursor of the strong adhesive material to a liner in which a first part is formed, and further laminating a base layer.

A base layer is further laminated on an article obtained by the above-described steps and including the adhesive layer that is formed on the fine structure surface of the liner and that includes the first part and the second part. Thus, an adhesive sheet including an adhesive surface that is located in one surface and that is covered with the liner can be obtained. FIG. 11 schematically illustrates a procedure of applying a strong adhesive material or a precursor of the strong adhesive material (101) to the liner in which the first part is formed, and further laminating a base layer (102).

Peeling of Second Liner Layer and Three-Dimensional Formation

Figure 12:
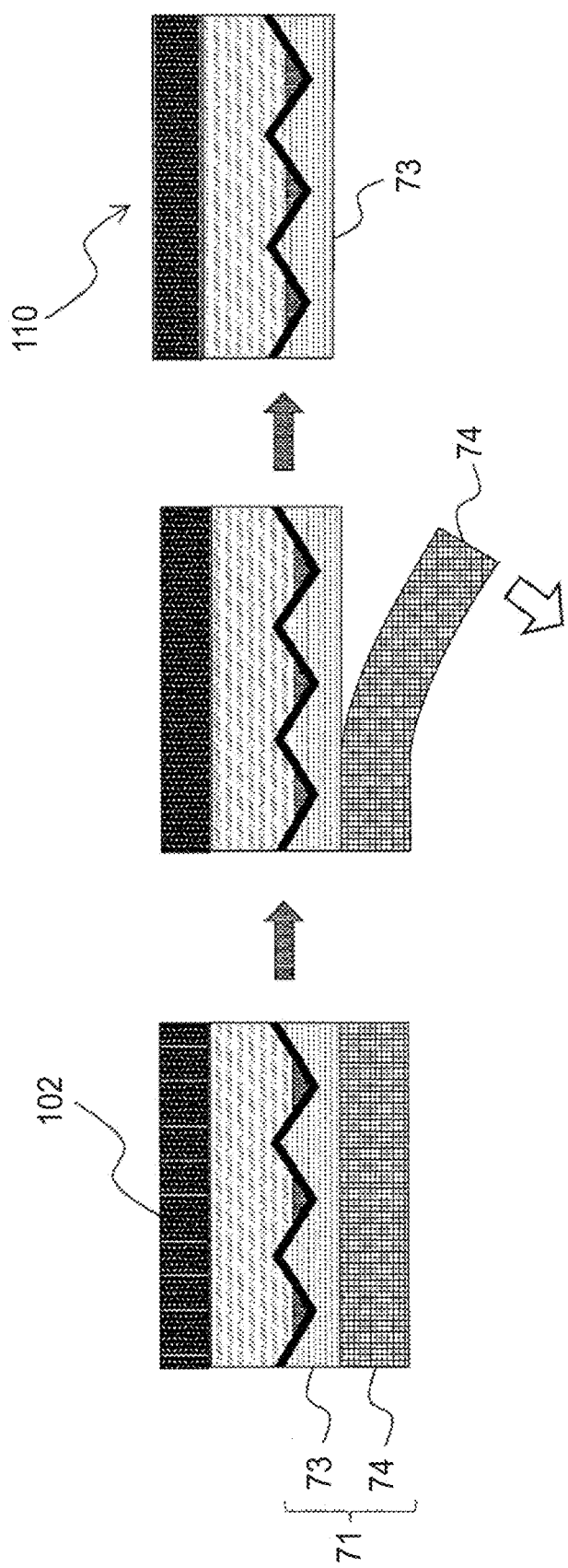
FIG. 12 is a view schematically illustrating a procedure of peeling only a second liner layer from a liner.

The liner of the obtained adhesive sheet includes the first liner layer and the second liner layer that are releasably laminated on one another. When, of the first liner layer and the second liner layer, the second liner layer is peeled from the first liner layer, the adhesive sheet including the first liner layer, the first part including the non-adhesive or weak adhesive material, the second part including the strong adhesive material, and the base layer laminated on one another in order from below is obtained. FIG. 12 is a view schematically illustrating a procedure of peeling only the second liner layer from the liner. The adhesive sheet from which the second liner layer is peeled includes a structure in which the adhesive layer is interposed between the base layer including a material enabling three-dimensional molding and the first liner layer. Thus, the adhesive sheet can be molded into a desired three-dimensional shape by a three-dimensional molding technique such as vacuum pressure molding.

Figure 13A:
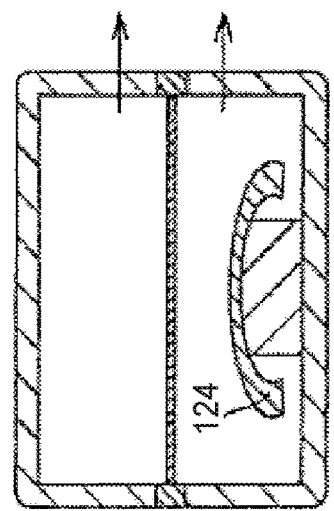
FIGS. 13A to 13D are views schematically illustrating a procedure of three-dimensional molding using a vacuum pressure molding machine.
Figure 13B:
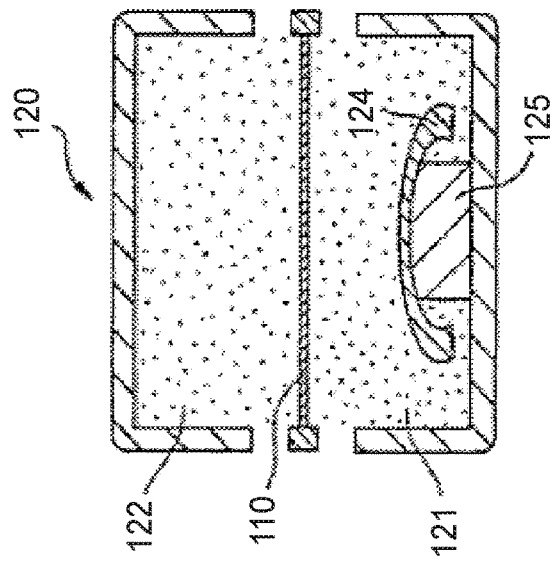
Figure 13C:
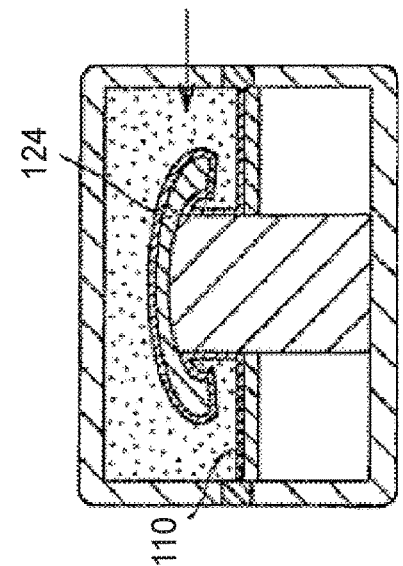
Figure 13D:
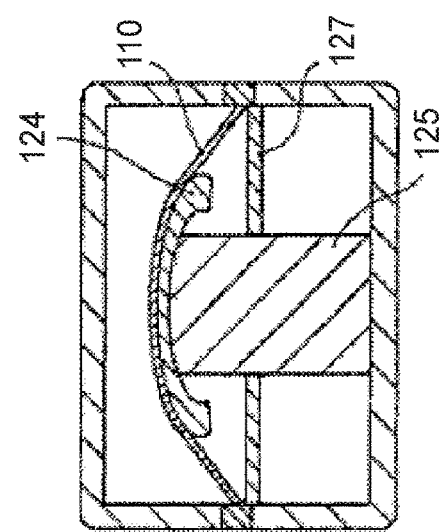

FIGS. 13A to 13D are views schematically illustrating a procedure of three-dimensional molding using a vacuum pressure molding machine. In FIG. 13A, a lower vacuum chamber (121) and an upper vacuum chamber (122) of a vacuum pressure molding machine (120) are open to atmospheric pressure, and an adhesive film (110) is set between the lower vacuum chamber (121) and the upper vacuum chamber (122). In the lower vacuum chamber (121), a mold (124) is set on an elevating table (125). In FIG. 13B, the lower vacuum chamber (121) and the upper vacuum chamber (122) are closed, and are both subjected to vacuuming, and the inside is brought into a vacuum state (for example, −1 MPa). Then, as illustrated in FIG. 13C, the adhesive film (110) is heated while lifting the mold (124) by the elevating table (125) up to the upper vacuum chamber (122), and thus the adhesive film (110) extends along the mold (124). As illustrated in FIG. 13D, after the adhesive film (110) is heated, the inside of the upper vacuum chamber (122) is pressurized to suitable pressure (for example, 2 Mpa), and thus the adhesive film (110) is pressed against a surface of the mold (124) and further extends along the surface to adhere to the surface. At this time, the adhesive film (110) is wrapped around a back surface of the mold (124) as well as side surfaces of the mold (124) to completely cover the surface of the mold, and no wrinkle is seen. However, since the adhesive surface of the adhesive film (110) is covered with the liner, the adhesive film (110) can be peeled easily from the mold (124). The adhesive film (110) is sufficiently cooled and is subsequently removed from the mold (124), and thus the three-dimensional molded adhesive film can be obtained.

Properties of Adhesive Film

Figure 14:
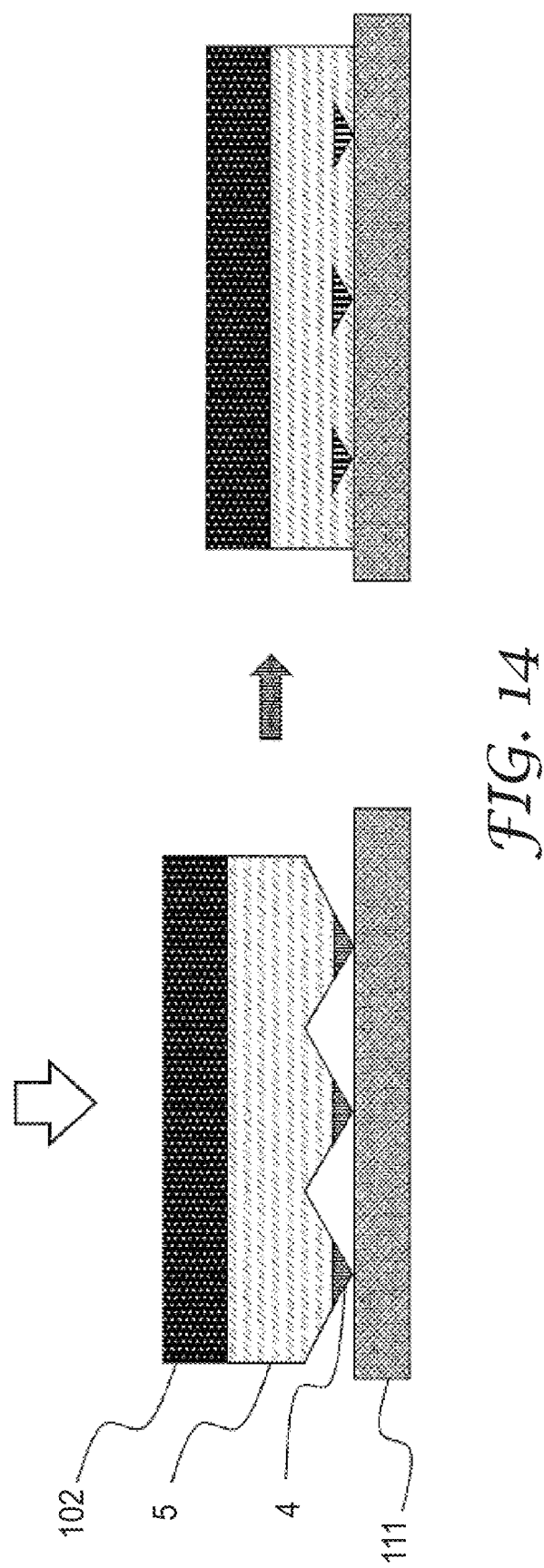
FIG. 14 is a view schematically illustrating behavior of a fine structure surface made when an adhesive film peeled from a liner is bonded to an adherend.

When the obtained adhesive film of the present disclosure is peeled from the liner and brought into contact with an adherend, the first part supports the adhesive film and the second part comes into no contact or a slight contact with the adherend while pressure applied to a pressure sensitive adhesive surface is low. Thus, the adhesive film has slidability under low pressure. On the other hand, when pressure above a certain level is applied, for example, the second part itself or the first part deforms, or the first part is incorporated into the second part, and thus the second part comes into contact with the adherend. Thus, the adhesive film exerts adhesive force. FIG. 14 schematically illustrates behavior of the fine structure surface made when the adhesive film peeled from the liner is bonded to an adherend.

The adhesive film of the present disclosure has sufficient slidability under low pressure, for example, when pressure applied to the surface of the adhesive layer is 100 g/cm$^2$ or less, 50 g/cm$^2$ or less, 10 g/cm$^2$ or less, or 5 g/cm$^2$ or less. In a preferred embodiment, the adhesive film of the present disclosure has a dynamic friction coefficient (up) of 1.10 or less, 1.05 or less, 1.00 or less, 0.95 or less, or 0.90 or less as tested according to JIS K 7125, except that a metal slip piece such as a steel material (for example, an SS400 material, may be plated with chrome or the like) is used. When the adhesive film has such low friction force, the adhesive film can easily slide and be aligned in a state where the adhesive film is slightly in contact with the adherend.

The adhesive film of the present disclosure sufficiently exhibits adhesive force to the adherend when relatively high pressure is applied to the surface of the adhesive layer. In an embodiment, the "relatively high pressure" can be defined as pressure corresponding to pressure generated by reciprocating a roller of 2 kg at a speed of 300 mm/minute by using a compression bonding apparatus defined in 10.2.4 of JIS Z 0237. In another embodiment, the "relatively high pressure" can be defined as pressure of 200 g/cm² or more, 300 g/cm² or more, 400 g/cm² or more, 500 g/cm² or more, 600 g/cm² or more, or 700 g/cm² or more. In a preferred embodiment, when the adhesive film of the present disclosure is compressed and bonded to a material such as a melamine resin, the adhesive film has 180° peel adhesion strength as tested under conditions of a temperature of 23° C. and a tensile speed of 200 mm/minute of 1.0 N/10 mm or more, 2.0 N/10 mm or more, 3.0 N/10 mm or more, or 4.0 N/10 mm or more in 48 hours after bonding. When the adhesive film has such adhesive force, peeling or the like is less likely to occur after the adhesive film is applied.

The adhesive film of the present disclosure includes the fine structure in the surface of the adhesive layer. Thus, when the adhesive film is applied to an adherend, the adhesive surface is less likely to incorporate air bubbles. Additionally, even when air bubbles are incorporated into the adhesive surface, the air bubbles can be released easily. Such a property is herein referred to as "air releasability". In an embodiment, the surface of the adhesive layer may further includes an additional groove-shaped structure for improving air releasability, apart from the above-described fine structure.

In an embodiment, the adhesive film of the present disclosure from which the liner layer is removed has a thickness of 0.1 mm or more, 0.2 mm or more, or 0.3 mm or more and 10.0 mm or less, 8.0 mm or less, 5.0 mm or less, 2.0 mm or less, 1.8 mm or less, or 1.6 mm or less. In addition, in an embodiment, the adhesive film of the present disclosure from which the liner layer is removed has bending rigidity of 200 mgf or more, 250 mgf or more, or 300 mgf or more and 85000 mgf or less, 68000 mgf or less, 42500 mgf or less, 17000 mgf or less, 16000 mgf or less, or 15000 mgf or less.

Usage Mode of Adhesive Film

The adhesive film of the present disclosure is molded in advance with the use of a mold having a three-dimensional shape corresponding to a shape of an adherend, and is transported close to the adherend in a state where the liner (first liner layer) is attached to the adhesive film. Then, immediately prior to performing bonding, the liner is peeled, and the adhesive film is fitted into the adherend while alignment is performed such that the three-dimensional shapes are matched. Note that herein, "fitting" typically includes moving an adhesive film having a three-dimensional shape corresponding to a shape of an adherend, along the shape of the adherend while a surface of an adhesive layer slides on a surface of the adherend. Since the adhesive layer of the adhesive film does not exert adhesive force under low pressure, alignment and fitting can be performed easily while sliding on the surface of the adherend. Then, after the adhesive film is disposed in place, strong pressure is applied to the surface of the adhesive film, for example, by scratching the surface of the adhesive film with a squeegee. Thus, adhesive force is exerted, and the adhesive film can be applied to the adherend with strength above a certain level. FIG. 15 schematically illustrates a procedure of fitting the adhesive film from which the liner is peeled into the adherend.

In another embodiment, the present disclosure relates to an article including a liner including a fine structure in a release surface, and an adhesive film including, in a surface of an adhesive layer, a fine structure complementary to the fine structure of the liner. Additionally, in another embodiment, the present disclosure relates to a liner including a fine structure in a release surface, and the fine structure includes recesses including a plurality of convex parts. The liner including the fine structure in the release surface may include a non-adhesive or weak adhesive material disposed in lowermost portions of the recesses. In another embodiment, the present disclosure relates to a mold for manufacturing such a liner, and the mold includes, in a surface, a fine structure including a plurality of convex parts. Details of the fine structure and the like are as described above.

EXAMPLES

The present disclosure will be described in details below with reference to examples, but the present disclosure is not intended to be limited to the examples.

Evaluation Method

Slidability

A sample was cut to a size of approximately 2.5 cm×approximately 7.5 cm, and one end of the sample from which a liner was peeled was griped. The sample was placed while being hung on a horizontally disposed flat glass plate in such a manner that a pressure sensitive adhesive surface came into contact with the plate. After this state was maintained for approximately 10 seconds, the end of the sample was lifted and pulled horizontally. Behavior at that time was evaluated according to the following criteria, and it was determined that the sample achieving a score of 1 or more had slidability.

3: Sample slides freely
2: Sample has some resistance, but slides easily
1: Sample has strong resistance and is slightly hard to slide
0: Sample cannot slide 180° Peel Adhesion Strength A sample cut to a width of 10 mm and a length of 100 mm was prepared. After the liner was peeled, the sample was compressed and bonded by using a squeegee to a plate including a melamine coated surface in such a manner that a pressure sensitive adhesive surface came into contact with the plate. After the sample stood at normal temperature for 48 hours, a 180° peeling test was performed under conditions of a temperature of 23° C. and a tensile speed of 200 mm/minute.

Size of First Part

The pressure sensitive adhesive surface of the sample from which the liner was peeled was observed by using a high precision microscope. Among square pyramid or square frustum structures formed in the pressure sensitive adhesive surface, one structure having the most clearly observable image was selected, and the overall height (in the normal direction), the overall bottom surface size, and the bottom surface size of the first part were measured at one location. Based on the measurement data, a proportion of the height of the first part with respect to the overall height was calculated.

Evaluation of Slidability Based on Dynamic Friction Coefficient

Measurement was carried out according to JIS K 7125, except for a slip piece. A sample cut to a width of 80 mm and a length of 150 mm was prepared. A sample from which the liner was peeled was placed on a table of a slip/peel tester (TSH-1202-50N, IMASS) in such a manner that a pressure sensitive adhesive surface was placed upward. Further, a 200 g rolled steel plate having a general structure (SS400, plated with chrome) was placed on the sample as a slip piece. The slip piece was pulled at a speed of 1000 mm/minute, and kinetic friction force ($F_D$) was measured by a load cell. From the measurement results, a dynamic friction coefficient ($\mu_D$) was calculated according to the following equation.

$$\mu_D = F_D/F_P$$

$F_D$: dynamic friction force (N)
$F_P$: normal force (N) (=1.96 N)

Bending Rigidity Measurement

A test piece was cut out of a sample to a predetermined width (W) and a predetermined length (L) such that the MD direction of the sample was the length (L). The test piece was set on a Gurley stiffness tester, and a scale (mgf) generated when the test piece was separated from a pendulum was measured. The measurement was performed by changing a load according to the test piece as necessary. The measurement was performed three times for each of both surfaces of the test picce, and an average value was calculated. Bending rigidity values of both the surfaces of the test piece were calculated from the obtained average value and the conditions of the size and the load of the test piece, and the average of both the surfaces was employed as a bending rigidity value (mgf) of the test piece.

Pencil Hardness

Measurement was performed according to JIS K 5600 May 4, Part 5-Section 4: scratch hardness (pencil method). A load applied on a pencil lead was 750 g and the speed was 60 mm/minute.

Production and Evaluation of Sample

Production Example 1

(1) Production of Mold Including Fine Structure

Figure 17:
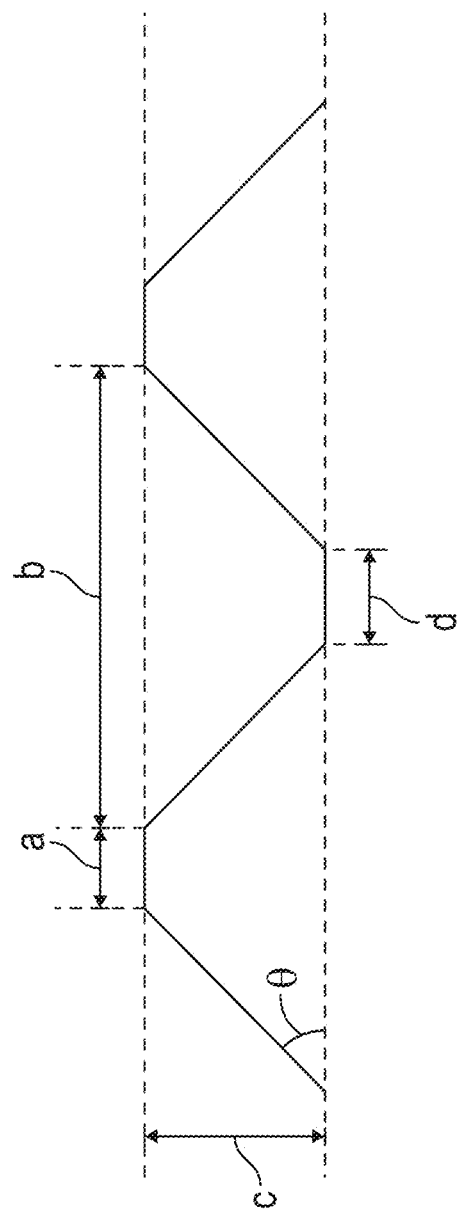
FIG. 17 is a representation of the distances used in Table 1 . . .

A mold including a plurality of uniformly disposed square pyramid or square frustum structures was produced by processing a flat plate of a resin or metal. Laser processing was used in the case of the resin, and processing with a diamond cutter was used in the case of the metal. The size of the square pyramid or square frustum structure in each mold is shown in Table 1. See FIG. 17 for an explanation of the distances "a," "b.", "c," "d," and the angle theta. Note that the size was measured by observing a surface of the mold by using a high precision microscope, and selecting one square pyramid or square frustum structure having the most clearly observable image.

TABLE 1

| Mold ID | Material | Angle (θ) (°) | Top (a) (μm) | Between tops (b) (μm) | Height (c) (μm) | Distance between cones/frustums (d) (μm) | Pitch (a + b) (μm) |
|---|---|---|---|---|---|---|---|
| A | Resin | 3.0 | 0.0 | 499.4 | 13.1 | 0.0 | 499.4 |
| B | Resin | 20.7 | 12.1 | 84.6 | 16.0 | 0.0 | 96.7 |
| C | Resin | 48.5 | 9.1 | 36.3 | 16.8 | 7.0 | 45.3 |
| D | Resin | 56.1 | 7.8 | 19.7 | 12.7 | 3.0 | 27.5 |
| E | Resin | 66.3 | 6.3 | 9.8 | 8.6 | 2.0 | 16.1 |
| F | Metal | 28.2 | 0.0 | 45.3 | 12.2 | 0.0 | 45.3 |
| G | Metal | 29.0 | 0.0 | 90.9 | 25.2 | 0.0 | 90.9 |
| H | Metal | 9.6 | 0.0 | 297.0 | 25.0 | 0.0 | 297.0 |
| I | Metal | 7.5 | 0.0 | 197.0 | 13.0 | 0.0 | 197.0 |

(2) Production of Liner Including Fine Structure

A base film in which a low density polyethylene (LDPE) sheet having a thickness of 33 μm was laminated on one surface of a polycarbonate (PC) sheet having a thickness of 75 μm was prepared. The 180° peel adhesive force between the PC sheet and the LDPE sheet was 0.09 N/25 mm as measured under the conditions of a temperature of 23° C. and a tensile speed of 200 mm/minute. Additionally, the pencil hardness of the PC sheet was 6B, and the bending rigidity was 154 mgf. A silicone solution (a toluene solution including KS-3601 (Shin-Etsu Chemical Co., Ltd.)) was applied to a surface of the LDPE sheet of the base film and then is dried to produce a base liner provided with a release surface. A mold was brought into contact with the release surface of the base liner, and the fine structure of the mold was transferred to the base liner by heat pressing to produce a liner including a fine structure. The fine structure on the liner had substantially the same size as the size of the fine structure of the mold.

(3) Formation of First Part

A water-based polyurethane solution (PUR-1: a solution mainly including Resamine D-6260 (Dainichiseika Color & Chemicals Mfg. Co., Ltd.), or PUR-2: a solution including Resamine D6260 (Dainichiseika Color & Chemicals Mfg. Co., Ltd.), isopropanol, and distilled water) was applied onto a fine structure surface of the liner, and then excess of the solution was scraped off with a doctor blade or a squeegee. The liner was heated in an oven at 80 to 100° C. to volatilize water, alcohol, other organic solvent, or a solvent including a mixture thereof that were in the solution, and thus a solid urethane resin was disposed in bottoms of the square pyramid or square frustum structures of the fine structure.

(4) Formation of Second Part (Adhesive)

A thermosetting acrylic adhesive precursor (containing methyl ethyl ketone as a solvent) was applied to the fine structure surface of the liner in which the solid urethane resin was disposed in the bottoms of the square pyramid or square frustum structures of the fine structure, and subsequently was dried in an oven. The thickness of the adhesive layer thus formed was approximately 35 μm.

(5) Production of Top Film

A black ABS resin film having a thickness of 300 μm (acrylonitrile/butadiene/styrene resin film, JSR), a black ASA resin film having a thickness of 300 μm (acrylate/styrene/acrylonitrile resin film, JSR), or a PP resin film having a thickness of 90 μm (polypropylene resin film including a surface subjected to corona treatment, DiaPlus Film Inc.) was prepared, and a primer solution (toluene/isopropanol solution including NK-350 (Nippon Shokubai Co., Ltd.)) was applied to one surface of the resin film and was dried. A colored solution of a clear coating resin was applied to the other surface of the resin film and was dried.

(6) Lamination of Top Film

The top film produced at step (5) was laminated on and bonded to an adhesive side of the liner including the fine structure provided with the first part and the second part prepared at step (4), such that the surface to which the primer solution was applied was in contact with the adhesive side, and a laminate was obtained.

(7) Three-Dimensional Molding

The polycarbonate sheet was peeled from the laminate obtained at step (6), and the resulting LDPE sheet surface was set into a vacuum pressure molding apparatus (DVT: Dual Vacuum Thermoforming) to come into contact with a mold having a semi-cylindrical three-dimensional shape as illustrated in FIG. 15, and was molded at 95° C. The mold was removed, and a three-dimensional molded adhesive film was obtained.

Production Example 2

Production Example 2 was similar to Production Example 1, except that a low-density polyethylene (LDPE) sheet having a thickness of 32 μm was laminated on one side of a polyethylene terephthalate (PET) sheet having a thickness of 51 μm, as the base film at step (2) of Production Example 1. The 180° peel adhesive force between the PET sheet and the LDPE sheet of the base film was 0.13 N/25 mm as measured under conditions of a temperature of 23° C. and a tensile speed of 200 mm/minute. Additionally, the pencil hardness of the PET sheet was B, and the bending rigidity was 222 mgf. In a case where the base film was used, the fine structure on the liner had substantially the same size as the size of the fine structure of the mold.

The configuration of each of adhesive films of Examples 1 to 13 produced according to Production Examples 1 or 2 is shown in Table 2.

TABLE 2

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| Mold ID | F | F | F | G | G | G | F | F | F | G | G | G | F |
| Liner |  |  | PC/LDPE |  |  |  |  |  |  |  | PET/LDPE |  |  |
| First part |  |  |  |  |  |  | PUR-1 |  |  |  |  |  | PUR-2 |
| Top film | ABS | ASA | PP | ABS | ASA | PP | ABS | ASA | PP | ABS | ASA | PP | PP |

Bending Rigidity Evaluation

Three-dimensional molding was performed according to step (7), and a test piece was cut out of the adhesive film of Examples 1, 5 or 6 from which the liner was peeled. Bending rigidity evaluation was performed. The results are shown in Table 3.

TABLE 3

|  |  | Test piece size (inch) | | Bending rigidity |
|---|---|---|---|---|
|  | Top film | W | L | (mgf) |
| Example 1 | ABS | 1 | 1.5 | 13338 |
| Example 5 | ASA | 1 | 1.5 | 12745 |
| Example 6 | PP | 1 | 1 | 313 |

Slidability Evaluation

Slidability evaluation based on a dynamic friction coefficient was performed on the adhesive films of Examples 3 and 9 from each of which the liner was peeled. As for Example 9, the dynamic friction coefficient of the adhesive film obtained before the three-dimensional molding was performed was measured. The results are shown in Table 4.

TABLE 4

|  | Liner | Three-dimensional molding | Dynamic frictional force* (N/cm$^2$) | Dynamic friction coefficient ($\mu_D$) |
|---|---|---|---|---|
| Example 3 | PC/LDPE | Before | Not measured | Not measured |
|  |  | After | 0.06 | 1.27 |
| Example 9 | PET/LDPE | Before | 0.05 | 1.04 |
|  |  | After | 0.06 | 1.18 | n = 2

Workability Evaluation

The LDPE sheet was peeled from the adhesive film of each of Examples 1 to 13 and was placed in an adherend having the same semi-cylindrical three-dimensional shape as the shape of the mold used for molding. The adhesive film was smoothly fitted into the shape of the adherend. Additionally, the adhesive film was able to be relatively easily removed from the adherend unless pressing force was applied to the adherend. However, when pressing force was applied to the adherend from above the decorative film by using a squeegee, the adhesive film was bonded to the adherend and was not easily removed. Note that at that time, no air bubble remained between the adhesive film and the adherend.

Comparative Production Example 1

A top film was produced in the same manner as at step (5) of Production Example 1. The same thermosetting acrylic adhesive precursor as the precursor used at step (4) of Production Example 1 was applied to one surface of the top film and was dried, and thus an adhesive film including an adhesive layer without a fine structure was obtained. After the LDPE sheet was laminated on a surface of the adhesive layer, the adhesive film was three-dimensionally molded in the same manner as at step (7) of Production Example 1. Workability evaluation was performed on the obtained adhesive film. The adhesive film was bonded from a location where the adhesive film came into contact with an adherend and could not smoothly coincide with the shape of the adherend. A large air pocket was generated between the adhesive film and the adherend.

Comparative Production Example 2

A control tack adhesive film of the related art was prepared. The adhesive film included, in an adhesive surface, non-adhesive projections containing ceramic beads and disposed at an interval of approximately 300 μm, and grooves for improving air releasability disposed at an interval of approximately 200 μm. Note that each of the projections did not include two or more parts joined to each other via an interface. After an LDPE film was laminated on the adhesive surface, three-dimensional molding was performed in the same manner as at step (7) of Production Example 1. Workability evaluation was performed on the obtained adhesive film. The adhesive film could not be bonded smoothly to an adherend, and the intrusion of air bubbles easily visible occurred between the adhesive film and the adherend.

Comparative Production Example 3

At step (7) of Production Example 1, three-dimensional molding using a vacuum thermoforming apparatus was performed without peeling the polycarbonate sheet from the laminate. However, the film was not formed into a shape coinciding with the shape of the mold, and wrinkles were generated in a wide area. desirable molding could not be performed. As for the film of Production Example 2 in which the base film was modified, three-dimensional molding was attempted without peeling the PET sheet; however, similarly, desirable molding could not be performed.

Comparative Production Example 4

At step (2) of Production Example 1, production of a liner including a fine structure was attempted by using, as a base film, a sheet including LDPE alone, instead of a sheet including an LDPE sheet laminated on polycarbonate. However, after drying an adhesive at step (4), generation of a number of wrinkles was observed in the liner. The liner was used to perform three-dimensional molding at step (7), and workability evaluation was performed on the obtained adhesive film. Wrinkles were generated in the adhesive film surface, and the adhesive film could not finely be bonded to an adherend.

Reference Production Example 1

Reference Production Example 1 was similar to Production Example 1, except that at step (2) of Production Example 1, a layer including polyethylene (PE) was provided as a base film in each of both surfaces of a sheet including polyethylene terephthalate (PET) or paper, and both the layer and the sheet were bonded with strength not to be easily peeled, and that the three-dimensional molding at step (7) was not performed. Some steps, that is, the step of transferring the fine structure of the mold and the step of forming the first part were also omitted. The results of the configuration and the slidability evaluation of each of the adhesive films of Reference Examples 1 to 10 produced according to the reference production example are shown in Table 5.

TABLE 5

| | Liner | | |
|---|---|---|---|
| | Mold ID | Main Material | Slidability |
| Reference Example 1 | A | PET | 1 |
| Reference Example 2 | B | Paper | 2 |
| Reference Example 3 | B | PET | 2 |
| Reference Example 4 | C | PET | 3 |
| Reference Example 5 | D | Paper | 3 |
| Reference Example 6 | D | PET | 3 |
| Reference Example 7 | E | Paper | 3 |
| Reference Example 8 | E | PET | 3 |
| Reference Example 9 | (Smooth liner) | Paper | 0 |
| Reference Example 10 | (Smooth liner) | PET | 0 |

Reference Production Example 2

An adhesive film was manufactured in the same manner as in Reference Production Example 1 by using a mold of Mold ID: F. However, when a first part was formed, the size of the first part was adjusted by repeatedly applying a polyurethane solution or adjusting the solid content of the polyurethane solution. The size of the first part, slidability, and peeling strength of each of the obtained adhesive films of Reference Examples 1 to 18 and the adhesive films of other Reference Examples 19 to 21 were evaluated. The results are shown in Table 6.

TABLE 6

| | Polyurethane solution | | Height of non-adhesive part (%) | Dynamic frictional force (N) | Dynamic frictional force (N/cm$^2$) | Dynamic friction coefficient $\mu_D$ | Peeling strength (48 H) (N/10 mm) |
|---|---|---|---|---|---|---|---|
| | Missing text | Missing text | | | | | |
| Reference Example 11 | 1 | 3 | 15 | 2.07 | 0.05 | 1.05 | 5.70 |
| Reference Example 12 | 1 | 10 | 36 | 1.69 | 0.04 | 0.86 | 4.32 |
| Reference Example 13 | 1 | 30 | 46 | 1.66 | 0.04 | 0.84 | 4.47 |
| Reference Example 14 | 2 | 30 | 48 | 1.58 | 0.04 | 0.81 | 4.26 |
| Reference Example 15 | 3 | 30 | 50 | 1.15 | 0.03 | 0.59 | 3.86 |
| Reference Example 16 | 4 | 30 | 54 | 0.86 | 0.02 | 0.44 | 2.93 |
| Reference Example 17 | 5 | 30 | 70 | 0.68 | 0.02 | 0.35 | 1.02 |
| Reference Example 18 | 0 | — | 0 | 5.36 | 0.13 | 2.73 | 9.56 |
| Reference Example 19 | (Smooth liner) | | — | — | — | | 10.67 |
| Reference Example 20 | Related Art Product 1 | | — | 2.48 | 0.06 | | 1.26 |
| Reference Example 21 | Related Art Product 2 | | — | 2.26 | 0.06 | | 1.15 |

REFERENCE SIGNS LIST

1: Bottom surface
2: Vertex
3: Side surface
4: First part
5: Second part
31: Adhesive layer surface
32: Adhesive layer base
61: Mold
71: Liner
72: Release coating
73: First liner layer
74: Second liner layer
81: Solution including a non-adhesive or weak adhesive material
82: Doctor blade or squeegee
101: Strong adhesive material or precursor of strong adhesive material
102: Base layer
103: Roller
110: Adhesive film
111: Adherend
120: Vacuum pressure molding machine
121: Lower vacuum chamber
122: Upper vacuum chamber.
124: Mold
125: Elevating table.
127: Partition

What is claimed is:

1. An adhesive film having a three-dimensional molded shape, the adhesive film comprising:
   a base layer;
   an adhesive layer including a fine structure in a surface; and
   a liner layer covering the adhesive layer, wherein
   the structure of the adhesive layer includes a plurality of convex parts,
   each of the plurality of convex parts includes two or more parts joined to each other via an interface,
   a first part present in a top of the convex part includes a non-adhesive or weak adhesive material, wherein the weak adhesive material is an adhesive having a storage modulus of elasticity of $3 \times 10^5$ Pa or greater as measured at a frequency of 1 Hz, and
   a second part present below the first part includes a strong adhesive material, wherein the strong adhesive material is an adhesive having a storage modulus of elasticity of less than $3 \times 10^5$ Pa,
   wherein the adhesive film includes portions differing in degree of stretching.

2. The adhesive film according to claim 1, wherein an angle θ formed by a side surface and a bottom surface of the convex part is 8° or more.

3. The adhesive film according to claim 1, wherein when a height of the convex part is set at 100%, a height of the first part is in the range of 10% to 90% of the convex part.

4. The adhesive film according to claim 1, wherein in the structure, the longest distance between centers of two convex parts adjacent to each other is 300 μm or less.

5. The adhesive film according to claim 1, wherein the convex part is a cone or a frustum, and the number of the cones or the frustums per $mm^2$ of the surface of the adhesive layer is 16 or more.

6. The adhesive film according to any one of claim 1, wherein
   the first part of the convex part includes polyurethane, poly(meth)acrylate, cellulose, silicone, an amine-based resin, a fluorine-based resin, or polyvinyl chloride.

7. The adhesive film according to claim 1, wherein the first part of the convex part includes a material having a storage elastic modulus (G') of $3 \times 10^5$ Pa or more as measured at a frequency of 1 Hz at normal temperature.

8. The adhesive film according to claim 1, wherein a dynamic friction coefficient as tested according to JIS K 7125 is 1.10 or less.

9. The adhesive film according to claim 1, wherein 180° peel adhesion strength as tested under conditions of a temperature of 23° C. and a tensile speed of 200 mm/minute is 1.0 N/10 mm or more in 48 hours after bonding.

10. The adhesive film according to claim 1, wherein the adhesive film from which the liner layer is removed has a thickness in the range of 0.1 mm to 10.0 mm.

11. The adhesive film according to claim 1, wherein the adhesive film from which the liner layer is removed has bending rigidity in the range of 200 mgf to 85000 mgf.

12. An adhesive sheet, comprising:
    an adhesive layer including a fine structure in a surface;
    a first liner layer covering the adhesive layer; and
    a second liner layer covering the first liner layer, wherein
    the structure of the adhesive layer includes a plurality of convex parts,
    each of the plurality of convex parts includes two or more parts joined to each other via an interface,
    a first part present in a top of the convex part includes a non-adhesive or weak adhesive material, wherein the weak adhesive material is an adhesive having a storage modulus of elasticity of $3 \times 10^5$ Pa or greater as measured at a frequency of 1 Hz, and
    a second part present below the first part includes a strong adhesive material, wherein the strong adhesive material is an adhesive having a storage modulus of elasticity of less than $3 \times 10^5$ Pa,
    wherein the adhesive film includes portions differing in degree of stretching.

13. The adhesive sheet according to claim 12, wherein peel adhesive force between the first liner layer and the second liner layer is 1 N/25 mm or less at 180° peel adhesion strength as tested under conditions of a temperature of 23° C. and a tensile speed of 200 mm/minute.

14. The adhesive sheet according to claim 12, wherein the second liner layer has hardness greater than hardness of the first liner layer.

15. The adhesive sheet according to claim 12, wherein the second liner layer has pencil hardness of 8B or more.

16. The adhesive sheet according to claim 12, wherein the second liner layer has bending rigidity of 50 mgf or more.

17. The adhesive sheet according to claim 12, wherein the adhesive sheet from which the second liner layer is removed has a maximum degree of stretching of 190% or more.

* * * * *